US009690709B2

(12) United States Patent
Sandoz et al.

(10) Patent No.: US 9,690,709 B2
(45) Date of Patent: Jun. 27, 2017

(54) VARIABLE HANDLES

(71) Applicant: Oracle International Corporation, Redwood Shores, CA (US)

(72) Inventors: Paul Sandoz, Le Versoud (FR); Brian Goetz, Williston, VT (US); John Robert Rose, San Jose, CA (US)

(73) Assignee: Oracle International Corporation, Redwood Shores, CA (US)

( * ) Notice: Subject to any disclaimer, the term of this patent is extended or adjusted under 35 U.S.C. 154(b) by 0 days.

(21) Appl. No.: 14/681,017

(22) Filed: Apr. 7, 2015

(65) Prior Publication Data

US 2016/0011982 A1 Jan. 14, 2016

Related U.S. Application Data

(60) Provisional application No. 62/024,334, filed on Jul. 14, 2014.

(51) Int. Cl.
*G06F 12/14* (2006.01)
*G06F 12/0875* (2016.01)
(Continued)

(52) U.S. Cl.
CPC ........ *G06F 12/0875* (2013.01); *G06F 3/0622* (2013.01); *G06F 3/0659* (2013.01); *G06F 3/0671* (2013.01); *G06F 9/30145* (2013.01); *G06F 9/45504* (2013.01); *G06F 12/1458* (2013.01); *G06F 2212/1052* (2013.01); *G06F 2212/452* (2013.01)

(58) Field of Classification Search
CPC ................ G06F 7/78; G06F 8/00–8/78; G06F 9/44–9/455; G06F 11/36
See application file for complete search history.

(56) References Cited

U.S. PATENT DOCUMENTS 6,415,435 B1 * 7/2002 McIntyre .................. G06F 8/76 707/999.103
7,484,067 B1 1/2009 Bollella
(Continued)

OTHER PUBLICATIONS

Crary, Typed Memory Management in a Calculus of Capabilities, 1999.*

*Primary Examiner* — H S Sough
*Assistant Examiner* — Zhan Chen
(74) *Attorney, Agent, or Firm* — Hickman Palermo Becker Bingham LLP

(57) ABSTRACT

According to one technique, a virtual machine identifies a first instruction to create a variable handle instance, the first instruction including declaration information that identifies a type of receiver and a variable held by the receiver to which the variable handle instance is configured to provide access. If access to the variable is permissible, the virtual machine creates the variable handle instance comprising constrained functions configured to execute constrained operations on a memory location of the variable. The virtual machine identifies a second instruction that specifies a call to a particular constrained, wherein the second instruction specifies the receiver or is implicitly bound to the receiver. The virtual machine identifies a particular memory location where the instance of the variable is stored and performs the particular constrained function with respect to the particular memory location.

30 Claims, 6 Drawing Sheets

(51) Int. Cl.
*G06F 9/30* (2006.01)
*G06F 3/06* (2006.01)
*G06F 9/455* (2006.01)

(56) References Cited

U.S. PATENT DOCUMENTS 9,432,298 B1 8/2016 Smith
2002/0100029 A1* 7/2002 Bowen ...................... G06F 8/41 717/140
2003/0159132 A1* 8/2003 Barnett ............... G06F 11/3672 717/124
2004/0205710 A1* 10/2004 Kawai ................... G06F 9/4433 717/116
2006/0150146 A1 7/2006 Meijer
2007/0055832 A1* 3/2007 Beat .................... G06F 13/4243 711/154
2007/0055966 A1* 3/2007 Waddington .............. G06F 8/72 717/144
2007/0079283 A1* 4/2007 Kuninobu ................. G06F 8/30 717/106
2007/0168951 A1* 7/2007 Vollmann ............ G06F 9/44521 717/118
2007/0294679 A1* 12/2007 Bobrovsky ......... G06F 9/45516 717/146
2009/0138680 A1* 5/2009 Johnson ................ G06F 9/3001 712/208
2009/0172348 A1* 7/2009 Cavin ................. G06F 9/30036 712/4
2010/0131720 A1* 5/2010 Harper, III .............. G06F 9/526 711/147
2011/0023019 A1* 1/2011 Aniszczyk .............. G06F 9/445 717/128
2011/0078692 A1 3/2011 Nickolls
2013/0346842 A1* 12/2013 Koara .................. G05B 19/048 715/211
2016/0011992 A1 1/2016 Sandoz et al.

* cited by examiner

VARIABLE HANDLES

PRIORITY CLAIMS; RELATED APPLICATIONS

This application is a non-provisional of U.S. Patent Application No. 62/024,334, filed Jul. 14, 2014, entitled "VarHandles", the entire contents of which is incorporated for all purposes as though fully stated herein.

TECHNICAL FIELD

Embodiments relate generally to techniques for supporting and/or utilizing improved memory access within programming languages.

BACKGROUND

In multiprocessor systems, processors often have one or more layers of memory cache, which improve performance both by speeding access to data and reducing traffic on the shared memory bus. However, while memory caches can greatly improve performance, they also present new challenges. For example, two processors that examine the same memory location may receive different results since one processor may use a stale cached value, whereas the other may pull an updated value from main memory. Furthermore, many compilers and computer architectures rewrite code to optimize the execution. For example, a processor may rewrite or reorder code to take advantage of the current data stored in its cache. However, many of the optimizations only ensure consistent program semantics for the case where a single processor/thread is executing the program. As a result, in a multi-processor/multithreaded environment, the reordering could result in unexpected behavior and inconsistent program states. For example, the computer architecture might perform a load/store early when it is most convenient to do so provided that the variable is not relied upon until the original program index of the instruction. However, with multiple threads or processors, performing operations early that are relied upon by other threads could result in a state that would otherwise be impossible to encounter.

BRIEF DESCRIPTION OF THE DRAWINGS

The present invention is illustrated by way of example, and not by way of limitation, in the figures of the accompanying drawings and in which like reference numerals refer to similar elements and in which.

DETAILED DESCRIPTION

Figure 1:
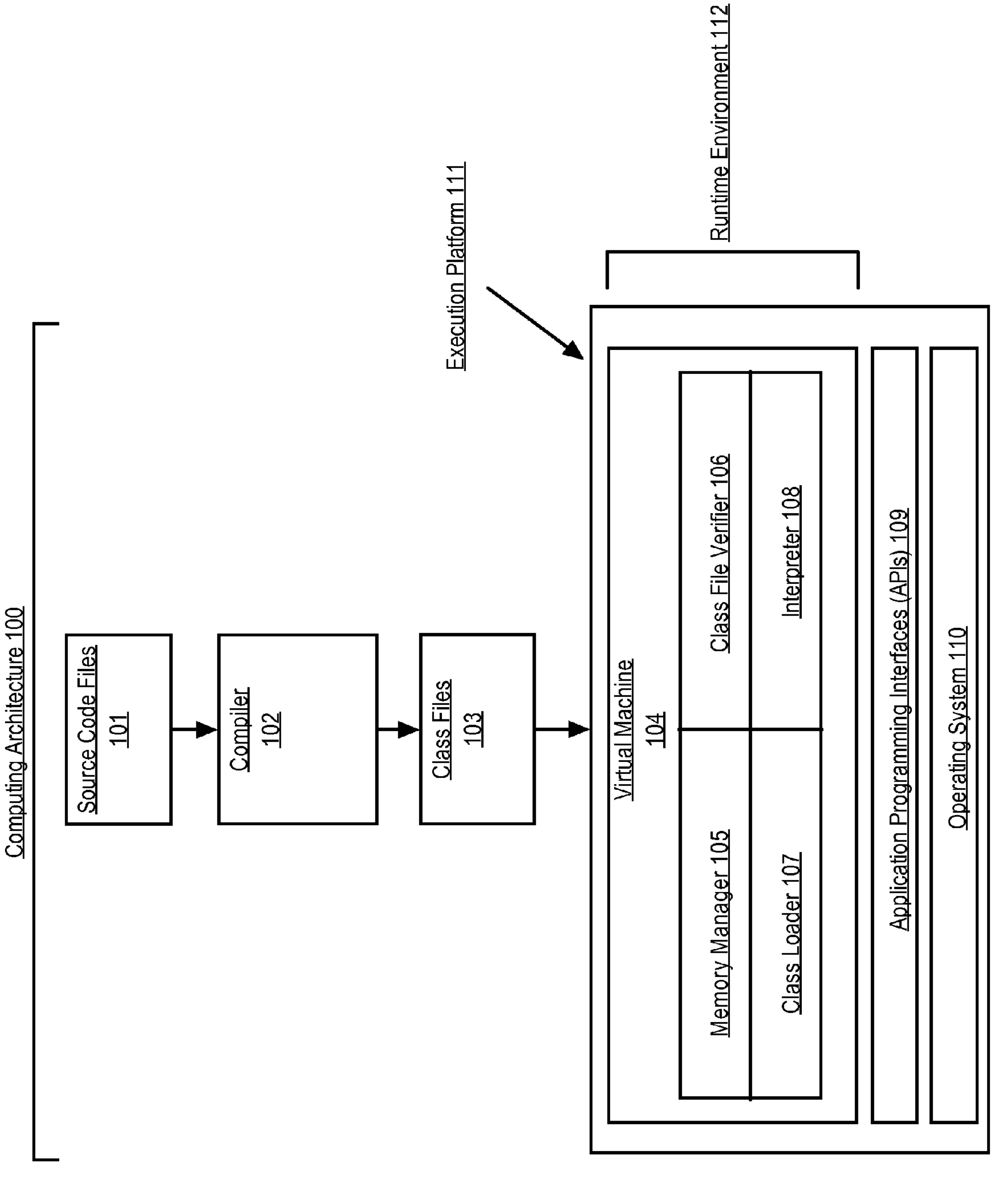
FIG. 1 is a logical block diagram illustrating an example computing architecture in which certain techniques described herein may be implemented, according to various embodiments.

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

Embodiments are described herein according to the following outline:

1.0 General Overview
- 1.1 Fenced Operations
- 1.2 Atomic Operations
- 1.3 Exposing Constrained Operations 2.0 Example Operating Architecture
- 2.1 Example Class File Structure
- 2.2 Example Virtual Machine Architecture
- 2.3 Loading, Linking, and Initializing 3.0 VarHandles
- 3.1 Example Constrained Operations
- 3.2 Example Interface
- 3.3 VarHandle Process Flow Field Example
- 3.4 VarHandle Process Flow Array Example
- 3.5 Optimizations
- 3.6 Relaxing The Return Type On Polymorphic Signature Methods
- 3.7 Generic Polymorphic Signatures
- 3.8 Consolidation of Code between VarHandles and MethodHandles
- 3.9 Memory Fences
- 3.10 Extensions of VarHandle Functionality 4.0 Hardware Overview 5.0 Extensions and Alternatives 6.0 Additional Disclosure

1.0. General Overview

Techniques are described herein for providing secure and efficient constrained access to memory locations through the use of "handles" that support a variety of different memory access modes.

1.1 Fenced Operations

Memory models define the conditions for knowing when writes to memory by other processors are visible to the current processor, and writes by the current processor are visible to other processors. For example, some processors exhibit a strong memory model where all processors see exactly the same value for any given memory location. Others exhibit a weaker memory model, where special instructions referred to as memory "barriers" or "fences" flush or invalidate the local processor cache in order to see writes made by other processors or make writes by a processor visible to others.

The effect of the aforementioned memory barriers is that the memory effects of operations before the fence are made visible before operations after the fence. Thus, the fence can be thought of as preventing operations from being reordered across the fence. In some cases, computing architectures provide support for general fences that prevent the reordering of any load/store operation before the fence with another load/store operation past the fence. However, others provide support for fine-grained fences which prevent the reordering of certain types of operations, such as a load-load fence preventing the reordering of load instructions before the fence with other load instructions after the fence, a load-store fence preventing the reordering of load operations before the fence with store operations after the fence, and so forth. The fine-grained fences typically require less overhead than general fences, thus allowing developers to optimize the execution of their program by using the least expensive fence which provides the required functionality. Certain types of memory access operations utilize fences in order to improve program consistency and avoid race conditions. These operations will henceforth be referred to as "fenced operations" or "fenced access", which include techniques such as relaxed access, volatile access, lazy access, and so forth.

1.2 Atomic Operations

Atomic operations may also be used to ensure program consistency. Atomic operations are operations that are performed as though a single unit of access. For example, the get-and-set atomic operation replaces the current value of a variable and "simultaneously" returns the old value of the variable. In some instances, atomic operations are implemented via spinlocks and memory fences. However, many computer architectures support native atomic operations that can be performed efficiently by the underlying hardware, rather than requiring implementation via spinlocks and memory fences at the software level. For example, a processor may be configured to read the memory location and write to the memory location in the same bus operations, thus preventing other processors from accessing that memory location in the middle of the atomic operation. As used herein, "constrained" operations/access may refer to either or both of "fenced" operations/access and "atomic" operations/access.

1.3 Exposing Constrained Operations

In some cases, how to expose an interface to such constrained operations in an efficient and convenient manner can be a significant challenge. For example, constrained operations may be performed via access to an "unsafe" library that interacts with arbitrary memory locations. However, for many language and virtual machine developers, allowing coders access to arbitrary memory addresses can undermine safety guarantees that the platform would otherwise like to make, resulting in unexpected behavior, such as segmentation faults or worse, that the language/virtual machine is designed to minimize or outright prevent from occurring. For example, the "unsafe" library may be a native library that is optimized for a particular processor type, but may not check "higher level" semantics, such as ensuring that a write to an array location is within bounds. As a result of the complexities that arise when using the "unsafe" library, language and virtual machine developers often place the responsibility of preventing or minimizing the possibility of unexpected behavior in the hands of coders.

Another potential solution is to restrict access to the "unsafe" library to trusted developers who are known to have the expertise to use the "unsafe" library in a safe and responsible manner. However, limiting access to the constrained operations to a small sub-set of developers hinders the ability for other developers to create robust and efficient software products.

1.4 VarHandles

In an embodiment, a VarHandle is an executable reference to memory, such as memory defined by memory location(s) (managed or unmanaged), object(s) or instantiation(s) of a class(es), field(s) of object(s), static field(s) of class(es), or element(s) of array(s). The values stored in the referenced memory may be referred to as variable(s), and the VarHandle provides a safe interface through which developers can access constrained operations to perform on the variable(s). In an embodiment, the VarHandle accesses a variable via a receiver that holds the variable, such as an object instance holding a field or an array holding an element. At a low level, constrained operations are performed via a call to an "unsafe" method which communicates with the underlying computer hardware architecture and accesses arbitrary memory locations. In some embodiments, a VarHandle is implemented as a class and an instantion of the class is referred to as a VarHandle instance or object.

For example, in the context of Java, constrained operations can be performed by calls to "sun.misc.Unsafe" which implements methods for performing constrained operations on arbitrary memory locations representing a variety of variables, such as Objects, ints, floats, chars, longs, doubles, and so forth. However, in many cases exposing these "unsafe" methods to software developers causes the risk that the memory locations may be manipulated in ways that the virtual machine cannot anticipate. This may result in runtime errors and/or crashes, such as segmentation faults, that the designers of the virtual machine endeavor to mitigate or prevent. In an embodiment, a VarHandle provides a safe way to expose these low level constrained operations to developers in a convenient and easy-to-use interface. Furthermore, in some embodiments, the virtual machine is configured to optimize the manner of access and safety checks to achieve virtually the same run-time performance as exposing a direct interface to the "unsafe" methods, but without the disadvantages of directly utilizing the "unsafe" method.

Thus, VarHandles are a mechanism to expose constrained operations to developers in a safe, convenient, and efficient manner that would greatly benefit the software community. For example, the field of "nonblocking algorithms" is a research area pertaining to high-performance concurrent data structures that use constrained access as a fundamental concurrency primitive. Thus, providing an environment where suitably skilled developers can implement such algorithms easily and safely would be a significant boon to the field.

2.0 Example Operating Architecture

FIG. 1 illustrates an example computing architecture 100, including a runtime environment 112, in which techniques described herein may be practiced. The techniques described herein often use terms and definitions from the Java programming language, the JavaVirtual Machine ("JVM"), and the Java Runtime Environment. It is contemplated, however, that the described techniques may be used in conjunction with any programming language, virtual machine architecture, or run-time environment. Thus, for example, terminology described in Java terms, such as "methods", are interchangeable with other terminology, such as "fuctions". Furthermore, the term "method" is also synonymous with the terms "class method" or "object method". A method is a set of code which is referred to by name and can be called (invoked) at various points in a program, which causes the method's code to be executed.

As illustrated in FIG. 1, a runtime environment 112 includes a virtual machine 104. The virtual machine 104 includes various components, such as a memory manager 105 (which may include a garbage collector), a class file verifier 106 to check the validity of virtual machine 104 code, a class loader 107 to locate and build in-memory representations of classes, and an interpreter 108 for executing the virtual machine 104 code (which may include a Just-in-Time "JIT" compiler). In some embodiments, the interpreter 108 implements aspects of both an interpreter and a JIT compiler.

In an embodiment, the computing architecture 100 includes source code files 101 that contain code that has been written in a particular programming language, such as Java, C, C++, C#, Ruby, Perl, and so forth. Thus, the source code files 101 adhere to a particular set of syntactic and/or semantic rules for the associated language. For example, code written in Java adheres to the Java Language Specification. However, since specifications are updated and revised over time, the source code files 101 may be associated with a version number indicating the revision of the specification to which the source code files 101 adhere. The exact programming language used to write the source code files 101 is generally not critical.

In various embodiments, the compiler 102 converts the source code, which is written according to a specification directed to the convenience of the programmer, to either machine or object code, which is executable directly by the particular machine environment, or an intermediate representation, such as bytecode, which is executable by a virtual machine 104 that is capable of running on top of a variety of particular machine environments. The bytecode is executable by the virtual machine 104 in a more direct and efficient manner than the source code. Converting source code to bytecode includes mapping source code functionality from the language to virtual machine functionality that utilizes underlying resources such as data structures. Often, functionality that is presented in simple terms via source code by the programmer is converted into more complex steps that map more directly to the machine operations that would be caused during execution by the virtual machine 104.

In some embodiments, the interpreter 108 implements aspects of both an interpreter and a JIT compiler. For example, Oracle's HotSpot interprets code from "bytecode", but also locates portions of the bytecode that are executed frequently (are "hot") and compiles those portions into efficient machine code tailored to the processor of the underlying computer hardware. The run-time environment 120 may run on top of lower-level software such as an operating system 110 which, in some embodiments, is accessed through one or more application programming interfaces (APIs). The combination of the virtual machine 104, the APIs 109, and the operating system 110 is referred to as the execution platform 111.

In order to provide clear examples, the source code files 101 have been illustrated as the "top level" representation of the program to be executed by the execution platform 111. However, although the computing architecture 100 depicts the source code files 101 as a "top level" program representation, in other embodiments the source code files 101 may be an intermediate representation received via a "higher level" compiler that processed code files in a different language into the language of the source code files 101. In order to illustrate clear examples, the following disclosure assumes that the source code files 101 adhere to a class-based object-oriented programming language. However, this is not a requirement to utilizing the features described herein.

In an embodiment, compiler 102 receives as input the source code files 101 and converts the source code files 101 into class files 103 that are in a format expected by the virtual machine 104. For example, in the context of the JVM, Chapter 4 of the Java Virtual Machine Specification defines a particular class file format to which the class files 103 are expected to adhere. In some embodiments, the class files 103 contain the bytecode that has been converted from the source code files 101. However, in other embodiments, the class files 103 may contain other structures as well, such as tables identifying constant values and/or metadata related to various structures (classes, fields, methods, etc.).

The following discussion will assume that each of the class files 103 represents a respective "class" defined in the source code files 101 (or dynamically generated by the compiler 102/virtual machine 104). However, the aforementioned assumption is not a strict requirement and will depend on the implementation of the virtual machine 104. Thus, the techniques described herein may still be performed regardless of the exact format of the class files 103. In some embodiments, the class files 103 are divided into one or more "libraries" or "packages", each of which includes a collection of classes that provide related functionality. For example, a library may contain one or more class files that implement input/output (I/O) operations, mathematics tools, cryptographic techniques, graphics utilities, and so forth. Further, some classes (or fields/methods within those classes) may include access restrictions that limit their use to within a particular class/library/package or to classes with appropriate permissions.

2.1 Example Class File Structure

Figure 2:
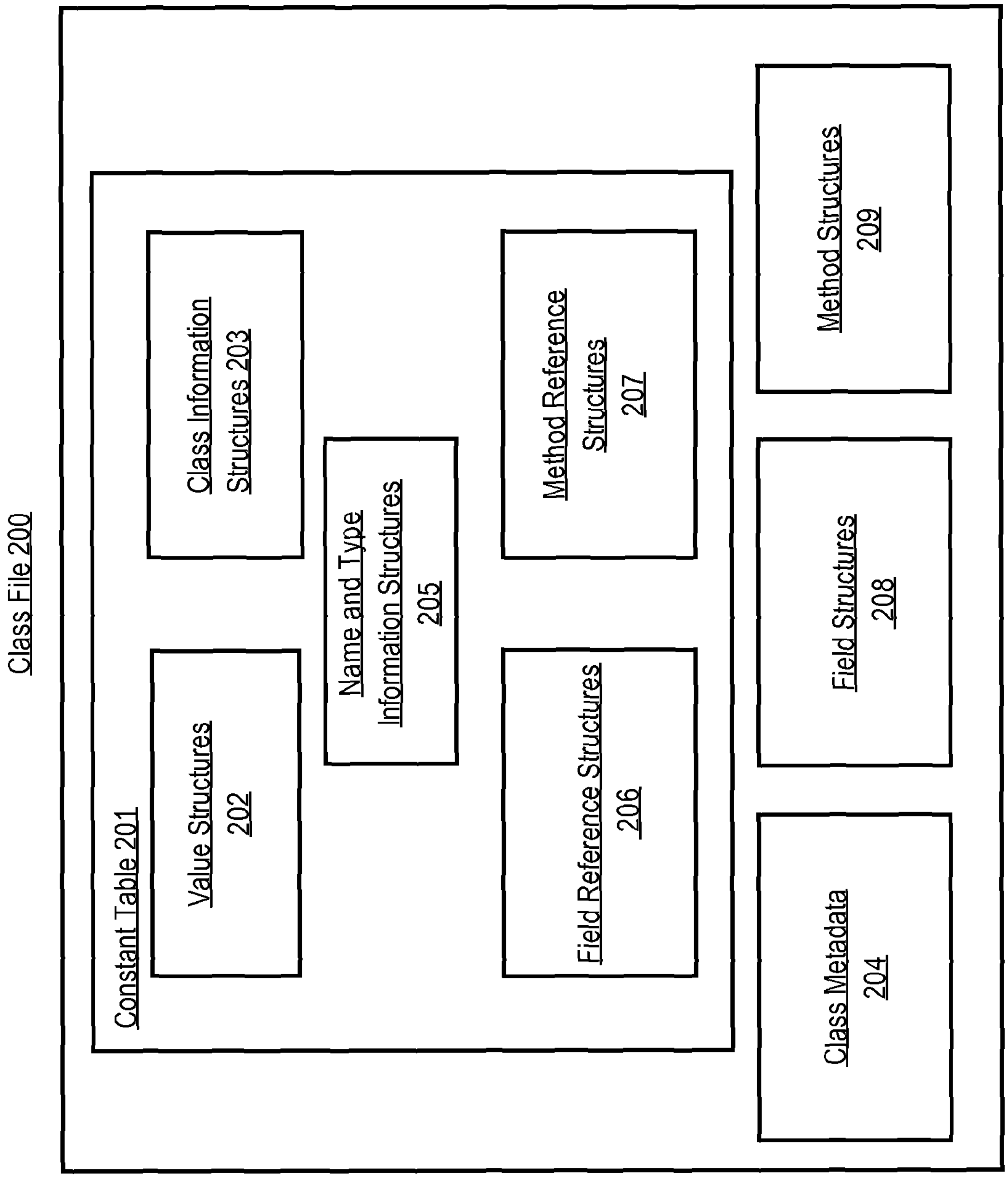
FIG. 2 is a block diagram illustrating an example class file according to an embodiment.

FIG. 2 illustrates an example structure for a class file 200 in block diagram form according to an embodiment. In order to provide clear examples, the remainder of the disclosure assumes that the class files 103 of the computing architecture 100 adhere to the structure of the example class file 200 described in this section. However, in a practical environment, the structure of the class file 200 will be dependent on the implementation of the virtual machine 104. Further, one or more features discussed herein may modify the structure of the class file 200 to, for example, add additional structure types. Therefore, the exact structure of the class file 200 is not critical to the techniques described herein. For the purposes of Section 2.1, "the class" or "the present class" refers to the class represented by the class file 200.

In FIG. 2, the class file 200 includes a constant table 201, field structures 208, class metadata 204, and method structures 209.

In an embodiment, the constant table 201 is a data structure which, among other functions, acts as a symbol table for the class. For example, the constant table 201 may store data related to the various identifiers used in the source code files 101 such as type, scope, contents, and/or location. The constant table 201 has entries for value structures 202 (representing constant values of type int, long, double, float, byte, string, and so forth), class information structures 203, name and type information structures 205, field reference structures 206, and method reference structures 207 derived from the source code files 101 by the compiler 102. In an embodiment, the constant table 201 is implemented as an array that maps an index i to structure j. However, the exact implementation of the constant table 201 is not critical.

In some embodiments, the entries of the constant table 201 include structures which index other constant table 201 entries. For example, an entry for one of the value structures 202 representing a string may hold a tag identifying its "type" as string and an index to one or more other value structures 202 of the constant table 201 storing char, byte or int values representing the ASCII characters of the string.

In an embodiment, field reference structures 206 of the constant table 201 hold an index into the constant table 201 to one of the class information structures 203 representing the class defining the field and an index into the constant table 201 to one of the name and type information structures 205 that provides the name and descriptor of the field. Method reference structures 207 of the constant table 201 hold an index into the constant table 201 to one of the class information structures 203 representing the class defining the method and an index into the constant table 201 to one of the name and type information structures 205 that provides the name and descriptor for the method. The class information structures 203 hold an index into the constant table 201 to one of the value structures 202 holding the name of the associated class. The name and type information structures 205 hold an index into the constant table 201 to one of the value structures 202 storing the name of the field/method and an index into the constant table 201 to one of the value structures 202 storing the descriptor.

In an embodiment, class metadata 204 includes metadata for the class, such as version number(s), number of entries in the constant pool, number of fields, number of methods, access flags (whether the class is public, private, final, abstract, etc.), an index to one of the class information structures 203 of the constant table 201 that identifies the present class, an index to one of the class information structures 203 of the constant table 201 that identifies the superclass (if any), and so forth.

In an embodiment, the field structures 208 represent a set of structures that identifies the various fields of the class. The field structures 208 store, for each field of the class, accessor flags for the field (whether the field is static, public, private, final, etc.), an index into the constant table 201 to one of the value structures 202 that holds the name of the field, and an index into the constant table 201 to one of the value structures 202 that holds a descriptor of the field.

In an embodiment, the method structures 209 represent a set of structures that identifies the various methods of the class. The method structures 209 store, for each method of the class, accessor flags for the method (e.g. whether the method is static, public, private, synchronized, etc.), an index into the constant table 201 to one of the value structures 202 that holds the name of the method, an index into the constant table 201 to one of the value structures 202 that holds the descriptor of the method, and the virtual machine 104 instructions that correspond to the body of the method as defined in the source code files 101.

In an embodiment, a descriptor represents a type of a field or method. For example, the descriptor may be implemented as a string adhering to a particular syntax. While the exact syntax is not critical, a few examples are described below.

In an example where the descriptor represents a type of the field, the descriptor identifies the type of data held by the field. In an embodiment, a field can hold a basic type, an object, or an array. When a field holds a basic type, the descriptor is a string that identifies the basic type (e.g., "B"=byte, "C"=char, "D"=double, "F"=float, "I"=int, "J"=long int, etc.). When a field holds an object, the descriptor is a string that identifies the class name of the object (e.g. "L ClassName"). "L" in this case indicates a reference, thus "L ClassName" represents a reference to an object of class ClassName. When the field is an array, the descriptor identifies the type held by the array. For example, "[B" indicates an array of bytes, with "[" indicating an array and "B" indicating that the array holds the basic type of byte. However, since arrays can be nested, the descriptor for an array may also indicate the nesting. For example, "[[L ClassName" indicates an array where each index holds an array that holds objects of class ClassName. In some embodiments, the ClassName is fully qualified and includes the simple name of the class, as well as the pathname of the class. For example, the ClassName may indicate where the file is stored in the package, library, or file system hosting the class file 200.

In the case of a method, the descriptor identifies the parameters of the method and the return type of the method. For example, a method descriptor may follow the general form "({ParameterDescriptor}) ReturnDescriptor", where the {ParameterDescriptor} is a list of field descriptors representing the parameters and the ReturnDescriptor is a field descriptor identifying the return type. For instance, the string "V" may be used to represent the void return type. Thus, a method defined in the source code files 101 as "Object m(int I, double d, Thread t) { . . . }" matches the descriptor "(I D L Thread) L Object".

In an embodiment, the virtual machine 104 instructions held in the method structures 209 include operations which reference entries of the constant table 201.

Using Java as an example, consider the following class

```
class A
{
int add12and13( ) {
      return B.addTwo(12, 13);
            }
}
```

In the above example, the Java method add12and13 is defined in class A, takes no parameters, and returns an integer. The body of method add12and13 calls static method addTwo of class B which takes the constant integer values 12 and 13 as parameters, and returns the result. Thus, in the constant table 201, the compiler 102 includes, among other entries, a method reference structure that corresponds to the call to the method B.addTwo. In Java, a call to a method compiles down to an invoke command in the bytecode of the JVM (in this case invokestatic as addTwo is a static method of class B). The invoke command is provided an index into the constant table 201 corresponding to the method reference structure that identifies the class defining addTwo "B", the name of addTwo "addTwo", and the descriptor of addTwo "(I I)I". For example, assuming the aforementioned method reference is stored at index 4, the bytecode instruction may appear as "invokestatic #4".

Since the constant table 201 refers to classes, methods, and fields symbolically with structures carrying identifying information, rather than direct references to a memory location, the entries of the constant table 201 are referred to as "symbolic references". One reason that symbolic references are utilized for the class files 103 is because, in some embodiments, the compiler 102 is unaware of how and where the classes will be stored once loaded into the runtime environment 112. As will be described in Section 2.3, eventually the run-time representation of the symbolic references are resolved into actual memory addresses by the virtual machine 104 after the referenced classes (and associated structures) have been loaded into the runtime environment and allocated concrete memory locations.

2.2 Example Virtual Machine Architecture

Figure 3:
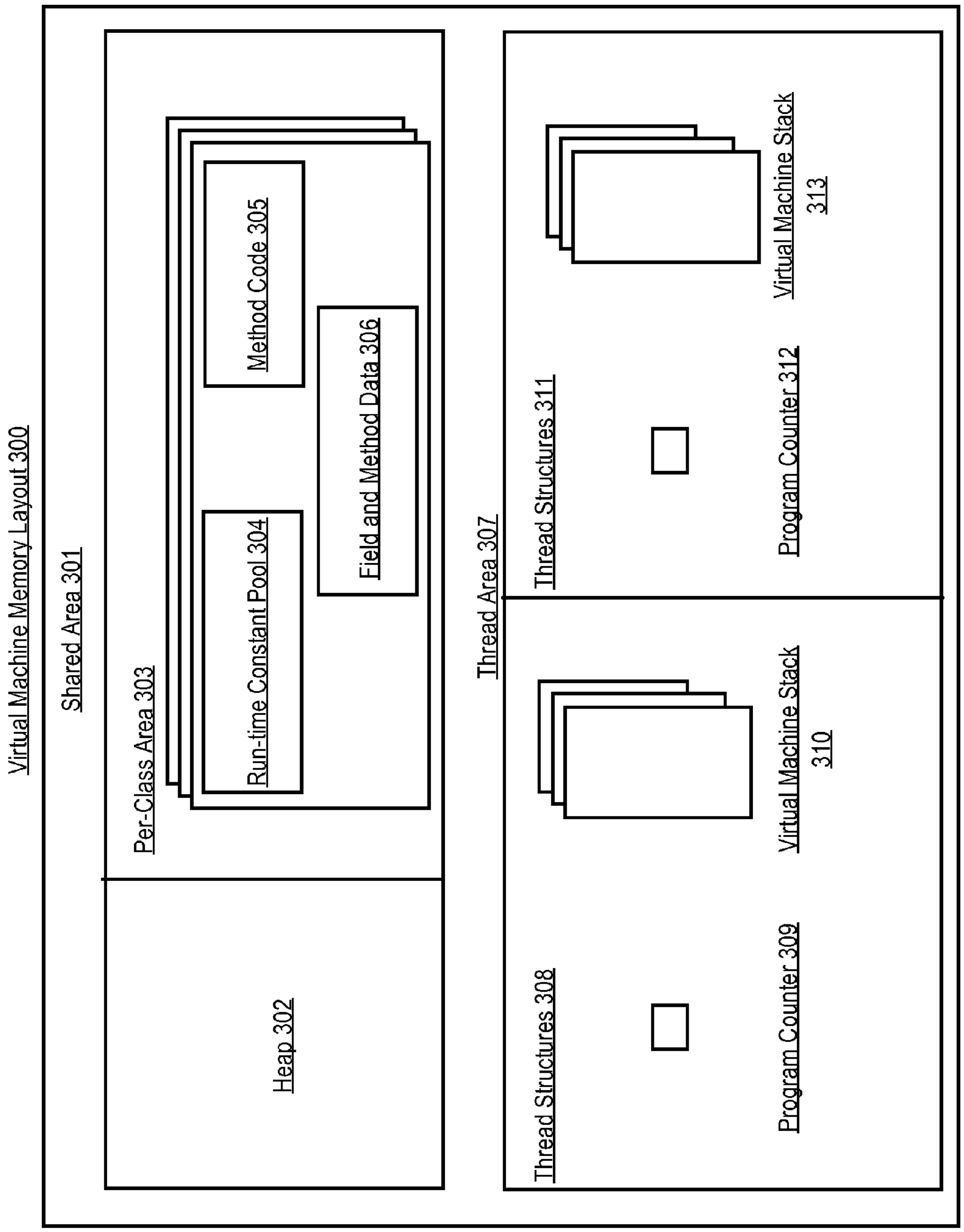
FIG. 3 is a block diagram illustrating example structures for a virtual machine run-time environment according to an embodiment.

FIG. 3 illustrates an example virtual machine memory layout 300 in block diagram form according to an embodiment. In order to provide clear examples, the remaining discussion will assume that the virtual machine 104 adheres to the virtual machine memory layout 300 depicted in FIG. 3. In addition, although components of the virtual machine memory layout 300 may be referred to as memory "areas", there is no requirement that the memory areas are contiguous.

In the example illustrated by FIG. 3, the virtual machine memory layout 300 is divided into a shared area 301 and a thread area 307.

The shared area 301 represents an area in memory where structures shared among the various threads executing on the virtual machine 104 are stored. The shared area 301 includes a heap 302 and a per-class area 303. In an embodiment, the heap 302 represents the run-time data area from which memory for class instances and arrays is allocated. In an embodiment, the per-class area 303 represents the memory area where the data pertaining to the individual classes are stored. In an embodiment, the per-class area 303 includes, for each loaded class, a run-time constant pool 304 representing data from the constant table 201 of the class, field and method data 306 (for example, to hold the static fields of the class), and the method code 305 representing the virtual machine 104 instructions for methods of the class.

The thread area 307 represents a memory area where structures specific to individual threads are stored. In FIG. 3, the thread area 307 includes thread structures 308 and thread structures 311, representing the per-thread structures utilized by different threads. In order to provide clear examples, the thread area 307 depicted in FIG. 3 assumes two threads are executing on the virtual machine 104. However, in a practical environment, the virtual machine 104 may execute any arbitrary number of threads, with the number of thread structures scaled accordingly.

In an embodiment, thread structures 308 includes program counter 309 and virtual machine stack 310. Similarly, thread structures 311 includes program counter 312 and virtual machine stack 313. In an embodiment, program counter 309 and program counter 312 store the current address of the virtual machine instruction being executed by their respective threads. Thus, as a thread steps through the instructions, the program counters are updated to maintain an index to the current instruction. In an embodiment, virtual machine stack 310 and virtual machine stack 313 each store frames for their respective threads that hold local variables and partial results, and is also used for method invocation and return.

In an embodiment, a frame is a data structure used to store data and partial results, return values for methods, and perform dynamic linking. A new frame is created each time a method is invoked. A frame is destroyed when the method that caused the frame to be generated completes. Thus, when a thread performs a method invocation, the virtual machine 104 generates a new frame and pushes that frame onto the virtual machine stack associated with the thread. When the method invocation completes, the virtual machine 104 passes back the result of the method invocation to the previous frame and pops the current frame off of the stack. In an embodiment, for a given thread, one frame is active at any point. This active frame is referred to as the current frame, the method that caused generation of the current frame is referred to as the current method, and the class to which the current method belongs is referred to as the current class.

Figure 4:
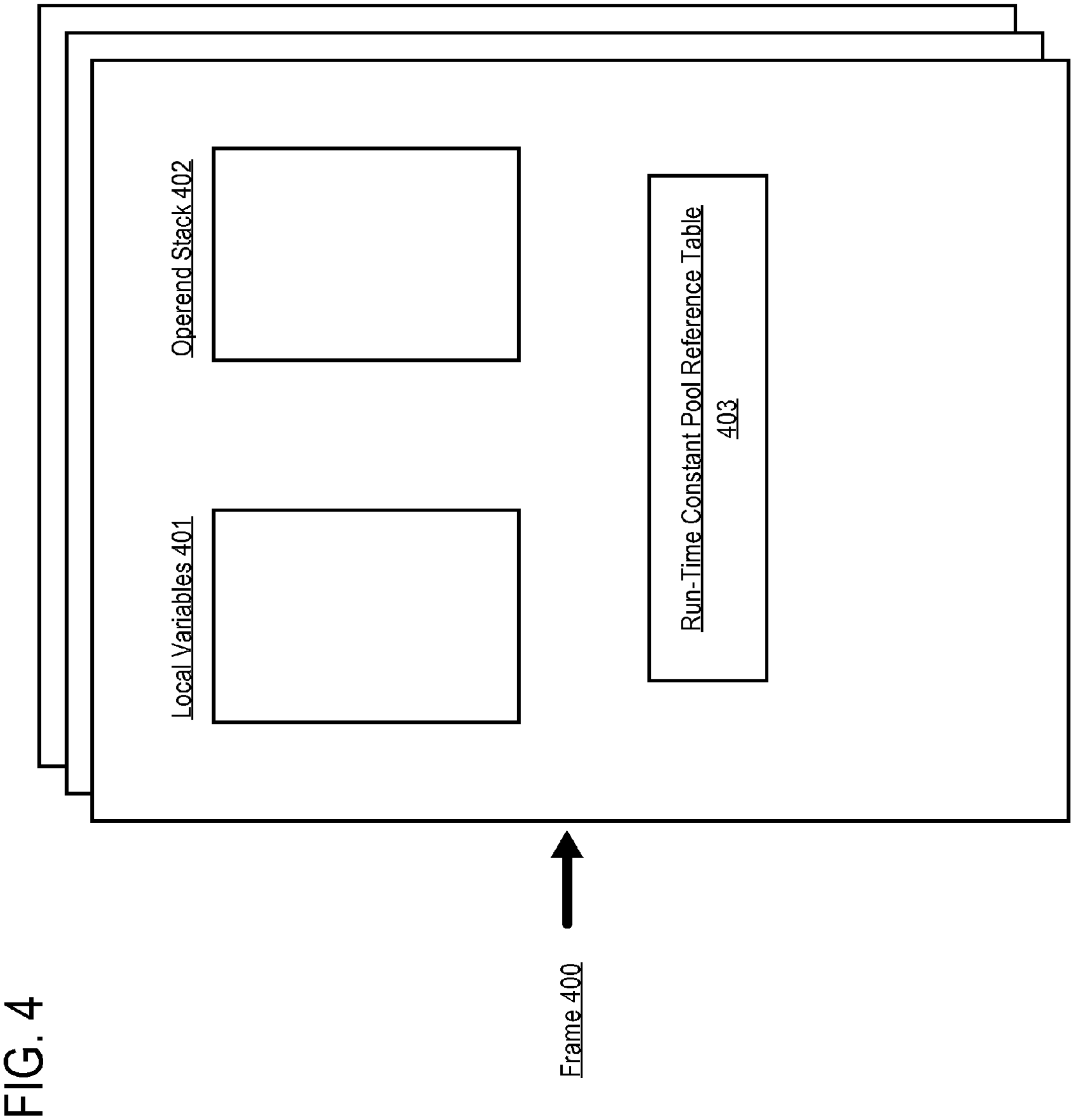
FIG. 4 is a block diagram illustrating an example structure for a frame on a virtual machine stack according to an embodiment.

FIG. 4 illustrates an example frame 400 in block diagram form according to an embodiment. In order to provide clear examples, the remaining discussion will assume that frames of virtual machine stack 310 and virtual machine stack 313 adhere to the structure of frame 400.

In an embodiment, frame 400 includes local variables 401, operand stack 402, and run-time constant pool reference table 403.

In an embodiment, the local variables 401 are represented as an array of variables that each hold a value, such as Boolean, byte, char, short, int, float, reference, and so forth. Further, some value types, such as longs or doubles, may be represented by more than one entry in the array. The local variables 401 are used to pass parameters on method invocations and store partial results. For example, when generating the frame 400 in response to invoking a method, the parameters may be stored in predefined positions within the local variables 401, such as indexes 1-N corresponding to the first to Nth parameters in the invocation.

In an embodiment, the operand stack 402 is empty by default when the frame 400 is created by the virtual machine 104. The virtual machine 104 then supplies instructions from the method code 305 of the current method to load constants or values from the local variables 501 onto the operand stack 502. Other instructions take operends from the operand stack 402, operate on them, and push the result back onto the operand stack 402. Furthermore, the operand stack 402 is used to prepare parameters to be passed to methods and to receive method results. For example, the parameters of the method being invoked could be pushed onto the operand stack 402 prior to issuing the invocation to the method. The virtual machine 104 then generates a new frame for the method invocation where the operends on the operand stack 402 of the previous frame are popped and loaded into the local variables 401 of the new frame. When the invoked method terminates, the new frame is popped from the virtual machine stack and the return value is pushed onto the operand stack 402 of the previous frame.

In an embodiment, the run-time constant pool reference table 403 contains a reference to the run-time constant pool 304 of the current class. The run-time constant pool reference table 403 is used to support resolution. Resolution is the process whereby symbolic references in the constant pool 304 are translated into concrete memory addresses, loading classes as necessary to resolve as-yet-undefined symbols and translating variable accesses into appropriate offsets into storage structures associated with the run-time location of these variables.

2.3 Loading, Linking, and Initializing

In an embodiment, the virtual machine 104 dynamically loads, links, and initializes classes. Loading is the process of finding a class with a particular name and creating a representation from the associated class file 200 of that class within the memory of the runtime environment 112. For example, creating the run-time constant pool 304, method code 305, and field and method data 306 for the class within the per-class area 303 of the virtual machine memory layout 300. Linking is the process of taking the in-memory representation of the class and combining it with the run-time state of the virtual machine 104 so that the methods of the class can be executed. Initialization is the process of executing the class constructors to set the starting state of the field and method data 306 of the class and/or create class instances on the heap 302 for the initialized class.

The following are examples of loading, linking, and initializing techniques that may be implemented by the virtual machine 104. However, in many embodiments the steps may be interleaved, such that an initial class is loaded, then during linking a second class is loaded to resolve a symbolic reference found in the first class, which in turn causes a third class to be loaded, and so forth. Thus, progress through the stages of loading, linking, and initializing can differ from class to class. Further, some embodiments may delay (perform "lazily") one or more functions of the loading, linking, and initializing process until the class is actually required. For example, resolution of a method reference may be delayed until a virtual machine 104 instruction invoking the referred method is executed. Thus, the exact timing of when the steps are performed for each class can vary greatly between implementations.

To begin the loading process, the virtual machine 104 starts up by invoking the class loader 107 which loads an initial class. The technique by which the initial class is specified will vary from embodiment to embodiment. For example, one technique may have the virtual machine 104 accept a command line argument on startup that specifies the initial class.

To load a class, the class loader 107 parses the class file 200 corresponding to the class and determines whether the class file 200 is well-formed (meets the syntactic expectations of the virtual machine 104). If not, the class loader 107 generates an error. For example, in Java the error might be generated in the form of an exception which is thrown to an exception handler for processing. Otherwise, the class loader 107 generates the in-memory representation of the class by allocating the run-time constant pool 304, method code 305, and field and method data 306 for the class within the per-class area 303.

In some embodiments, when the class loader 107 loads a class, the class loader 107 also recursively loads the superclasses of the loaded class. For example, the virtual machine 104 may ensure that the superclasses of a particular class are loaded, linked, and/or initialized before proceeding with the loading, linking and initializing process for the particular class.

During linking, the virtual machine 104 verifies the class, prepares the class, and performs resolution of the symbolic references defined in the run-time constant pool 304 of the class.

To verify the class, the virtual machine 104 checks whether the in-memory representation of the class is structurally correct. For example, the virtual machine 104 may check that each class except the generic class Object has a superclass, check that final classes have no sub-classes and final methods are not overridden, check whether constant pool entries are consistent with one another, check whether the current class has correct access permissions for classes/fields/structures referenced in the constant pool 304, check that the virtual machine 104 code of methods will not cause unexpected behavior (e.g. making sure a jump instruction does not send the virtual machine 104 beyond the end of the method), and so forth. The exact checks performed during verification are dependent on the implementation of the virtual machine 104. In some cases, verification may cause additional classes to be loaded, but does not necessarily require those classes to also be linked before proceeding. For example, assume Class A contains a reference to a static field of Class B. During verification, the virtual machine 104 may check Class B to ensure that the referenced static field actually exists, which might cause loading of Class B, but not necessarily the linking or initializing of Class B. However, in some embodiments, certain verification checks can be delayed until a later phase, such as being checked during resolution of the symbolic references. For example, some embodiments may delay checking the access permissions for symbolic references until those references are being resolved.

To prepare a class, the virtual machine 104 initializes static fields located within the field and method data 306 for the class to default values. In some cases, setting the static fields to default values may not be the same as running a constructor for the class. For example, the verification process may zero out or set the static fields to values that the constructor would expect those fields to have during initialization.

During resolution, the virtual machine 104 dynamically determines concrete memory address from the symbolic references included in the run-time constant pool 304 of the class. To resolve the symbolic references, the virtual machine 104 utilizes the class loader 107 to load the class identified in the symbolic reference (if not already loaded). Once loaded, the virtual machine 104 has knowledge of the memory location within the per-class area 303 of the referenced class and its fields/methods. The virtual machine 104 then replaces the symbolic references with a reference to the concrete memory location of the referenced class, field, or method. In an embodiment, the virtual machine 104 caches resolutions to be reused in case the same class/name/descriptor is encountered when the virtual machine 104 processes another class. For example, in some cases, class A and class B may invoke the same method of class C. Thus, when resolution is performed for class A, that result can be cached and reused during resolution of the same symbolic reference in class B to reduce overhead.

In some embodiments, the step of resolving the symbolic references during linking is optional. For example, an embodiment may perform the symbolic resolution in a "lazy" fashion, delaying the step of resolution until a virtual machine 104 instruction that requires the referenced class/method/field is executed.

During initialization, the virtual machine 104 executes the constructor of the class to set the starting state of that class. For example, initialization may initialize the field and method data 306 for the class and generate/initialize any class instances on the heap 302 created by the constructor. For example, the class file 200 for a class may specify that a particular method is a constructor that is used for setting up the starting state. Thus, during initialization, the virtual machine 104 executes the instructions of that constructor.

In some embodiments, the virtual machine 104 performs resolution on field and method references by initially checking whether the field/method is defined in the referenced class. Otherwise, the virtual machine 104 recursively searches through the super-classes of the referenced class for the referenced field/method until the field/method is located, or the top-level superclass is reached, in which case an error is generated.

3.0 VarHandles

In an embodiment, a VarHandle is an executable reference to memory, such as memory defined by memory location(s) (managed or unmanaged), object(s) or instantiation(s) of a class(es), field(s) of object(s), static field(s) of class(es), or element(s) of array(s). In some embodiments, VarHandles are implemented as a class which can be instantiated to create VarHandle instances/objects. In an embodiment, the VarHandle accesses a variable via a receiver that holds the variable, such as an object instance holding a field or an array holding an element. At a low level, constrained operations are performed via a call to low-level intrinsics which communicate with the underlying computer hardware architecture and accesses arbitrary memory locations. For example, in the context of Java, constrained operations can be performed by calls to "sun.misc.Unsafe" which implements methods for performing constrained operations on arbitrary memory locations representing a variety of variables, such as Objects, ints, floats, chars, longs, doubles, and so forth. However, in many cases exposing these "unsafe" methods to software developers causes the risk that the memory locations may be manipulated in ways that the virtual machine 104 cannot anticipate. This may result in run-time errors and/or crashes, such as segmentation faults, that the designers of the virtual machine 104 endeavor to mitigate or prevent.

One previous solution has been to restrict access to the "unsafe" methods to trusted developers who are known to have the expertise to use the "unsafe" methods in a safe and responsible manner. However, limiting access to the "unsafe" methods to a small sub-set of developers hinders the ability for other developers to create robust and efficient software products. In an embodiment, VarHandles provide a safe way to expose these low level constrained operations to developers in a convenient and easy-to-use interface. Furthermore, in some embodiments, the virtual machine 104 is configured to optimize the manner of access and safety checks to achieve virtually the same run-time performance as exposing a direct interface to the "unsafe" methods, without the disadvantages inherent permitting direct access to the "unsafe" methods 3.1 Example Constrained Operations The techniques described herein are applicable to virtually any type of constrained operations. However, in order to provide clear examples, the operations described in reference to VarHandles will include relaxed-get and relaxed-set, volatile-get and volatile-set, acquire-get and release-set (lazy get/set), and compare-and-set and get-and-set. However, different embodiments may implement different sets of constrained operations. For example, other embodiments may also support atomic addition, subtraction, or other atomic arithmetic operations.

In an embodiment, relaxed-get and relaxed-set perform relaxed fenced operations. In a relaxed fenced operation, ordering is guaranteed only within a particular thread's execution. Thus, if one thread performs stores, there is no guarantee that another thread would see the stores in the same order. For example, if Thread A performs Store 1 to variable a, and then performs Store 2 to variable b, there is a chance the store to variable b could become visible to another Thread B before the store to variable a.

In an embodiment, volatile-get and volatile-set perform volatile fenced operations. In a volatile fenced operation, sequential ordering is enforced between volatile stores and volatile loads. Thus, volatile fenced operations bypass local thread caches with reads and writes being performed straight to main memory.

In an embodiment, acquire-get and release-set perform lazy fenced operations. In lazy fenced operations, synchronization is performed between the release-set and the acquire-get to ensure that happens-before relationships can be carried over between threads at particular points during execution. For example, if Thread A performs Store 1 into variable a using relaxed-set and then performs Store 2 into variable b using release-set, the happens-before relationship between the storage of variable a and variable b is maintained with respect to a subsequent acquire-get. Thus, if Thread B were to read variable b using acquire-get after the storage to b becomes visible, there would be a guarantee that the storage to a would happen beforehand in Thread B's context. As a result, once the storage to b is made visible as a result of the acquire-get, the storage to a is also made visible to Thread B.

In an embodiment, compare-and-set is an atomic operation that compares the contents of a memory location to a given value and modifies the contents to a new value only if the comparison is true. In an embodiment, get-and-set is an atomic operation that writes a value to a memory location and returns the old value of the memory location.

In some embodiments, VarHandles also support "normal" or "unconstrained" access to variables which provide no guarantee as to the atomicity or reordering of the stores/loads to the variable in memory. Thus, embodiments as described herein apply to a broad range of ordering and atomicity constraints, including "null" constraints associated with "normal" memory access. Thus, in some embodiments, the "normal" or "unconstrained" access mode is an option among several options available using a VarHandle, each option imposing a different level of constraint on the memory access.

3.2 Example Interface

As mentioned above, VarHandles reference "receivers" which hold the variable, such as an object instance holding a field or an array holding an element. The types of "receivers" and the types of "variables" held by the "receivers" are implementation specific. The techniques described herein are applicable to virtually any type of "receiver" and "variable". However, the following represents examples of "receivers" and "variables" that may be accessed via a VarHandle.

In an embodiment, VarHandles hold references to one or more of (1) static fields, where the receiver is a class holding the static field, (2) instance fields, where the receiver is an instance of a class holding the field, or (3) an array element, where the receiver is an array holding that element at a defined index in the array. Thus, each receiver is associated with a particular type of variable access, such as (1) referring to static access, (2) referring to instance access, and (3) referring to array access.

However, in some embodiments, VarHandles represent receivers which refer to off-heap or an unmanaged memory location outside of the virtual machine 104. For example, rather than language-based receiver types such as classes holding fields/arrays holding elements, library-based receiver types may be used instead. In this case, a receiver type may be defined in a library with a corresponding VarHandle implementation that accepts instances of that class as a receiver. For instance, one such representation could be a receiver type that holds a base address to off-head/direct/unmanaged memory and a bound, where memory accesses are constrained to [base, base+bound]). The VarHandle would then store data related to that receiver type and use the base/bound accordingly to access memory.

In an embodiment, the variables held by the "receivers" include one or more of: 'Object' references, statically typed 'Object' references (subtype of 'Object'), "int", or "long". However, other embodiments may have "receivers" that can hold many other types of primitive variables, such as floats, doubles, chars, and so forth. In addition, other embodiments may provide support for "receivers" that hold "primitive like" variables, such as strings. Furthermore, in other embodiments, the variables held by the "receivers" may represent memory areas outside of the heap 302 or even outside of the runtime environment 112. For example, VarHandles may represent references to structures in the memory area of a different virtual machine/runtime environment. For clarity, the italicized Object refers to a generic object structure which acts as a superclass to all other classes, as in the Java programming language. Other objects types are referred to as "statically typed objects" and are a sub-class of Object.

In some embodiments, a VarHandle performs constrained operations on a receiver holding a value type, as described in U.S. Provisional application 61/992,753, filed May 13, 2014, which is hereby incorporated by reference for all purposes as if set forth herein in its entirety.

In an example embodiment, assuming there are three types of receivers and four types of variables, the number of implementations are 12 (3×4) for each constrained operation. For example, an implementation that handles constrained accesses to static fields of Objects, arrays of statically typed objects, instance fields of ints, and so forth in various combinations. The combination of receiver type and variable type will be referred to as an "access type". Further, there are 9 (3×3) different interface shapes in the example embodiment since Object references and statically typed object references can share a common interface shape (both can be represented using the generic Object type), but have different implementations. For example, the latter might perform explicit type casting where as for the former type casting would be redundant. However, the number of implementations and/or interface shapes is dependent on the number of different access types supported by a given embodiment. Further, assuming there are eight different types of supported constrained operations, the example embodiment would possess 96 (8*12) different constrained operation implementations. For example, an implementation of relaxed-get where the receiver is a static field and the variable is a statically typed object, an implementation of volatile-set where the receiver is an instance field and the variable is an int, and so forth in various combinations.

In some embodiments, VarHandles are implemented using a separate abstract class for each interface shape, resulting in a collection of nine different abstract classes. The abstract classes can then be sub-classed by classes which implement (includes code for) the constrained operation methods for a given access type. For example, one-subclass may implement the case where the receiver is an array and the variable is a generic Object and another may implement the case where the receiver is an array and the variable is a statically typed object. Both share the same interface shape and thus can derive from the same abstract class, but provide different implementations. However, in order to simplify access to VarHandles, some embodiments define a single abstract class for VarHandles that includes a polymorphic method signature for each constrained operation. For example, in Java code, the abstract class might appear in part as,

```
public abstract class VarHandle {
. . .
// Relaxed accessors
public final native
@MethodHandle.PolymorphicSignature
Object get(Object. . . args);
public final native
@MethodHandle.PolymorphicSignature
Object set(Object. . . args);
// Volatile accessors
public final native
@MethodHandle.PolymorphicSignature
Object getVolatile(Object. . . args);
public final native
@MethodHandle.PolymorphicSignature
Object setVolatile(Object. . . args);
// Lazy accessors
public final native
@MethodHandle.PolymorphicSignature
Object getAcquire(Object. . . args);
public final native
@MethodHandle.PolymorphicSignature
Object setRelease(Object. . . args);
// Compare and set accessor
public final native
@MethodHandle.PolymorphicSignature
Object compareAndSet(Object. . . args);
public final native
@MethodHandle.PolymorphicSignature
Object getAndSet(Object. . . args);
. . . }
```

The following examples reference VarHandle in order to illustrate clear examples, but the techniques described herein are not limited to the exact format of the class as it appears in VarHandle example.

In an embodiment, a polymorphic signature is a special type of signature that indicates the method can accept any arbitrary number of arguments and argument types as well as be of any return type. As a result, a subclass of VarHandle that implements the methods corresponding to the polymorphic signatures may use potentially any interface shape and still pass verification. Thus, one abstract class is sufficient to cover the different access types and developers can utilize the constrained operation methods of any sub-class of VarHandle in a relatively uniform manner.

In an embodiment, a VarHandle sub-class holds four method type descriptors corresponding to the four possible method descriptors of the constrained operations and a "varform" holding "membernames". For example, the descriptors for the "-get" operations can be the same, likewise for the "-set" operations since the argument and return types of those methods match. The method type descriptors held by the VarHandle subclass govern the method signatures of the implemented constrained operation methods. Thus, in order to properly use a constrained operation method, the call site invokes the method using the variables and return type specified by the corresponding descriptor. A "varform" represents the behavior of the different constrained operations. Thus, in the example embodiment, the varform holds eight "membernames", each characterizing the behavior of a different constrained operation method. For example, for each constrained operation, the corresponding "membername" may represent code or instructions for performing the constrained operation for the implemented access type.

3.3 VarHandle Process Flow Field Example

Figure 5:
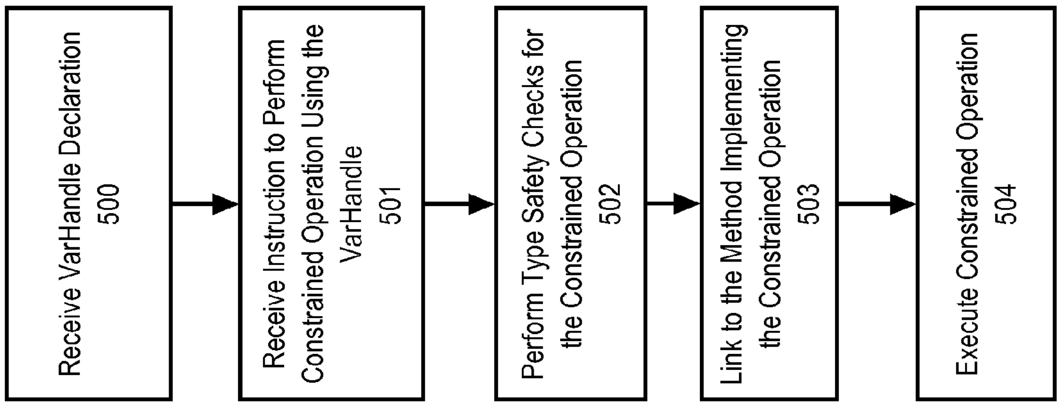
FIG. 5 illustrates an example process for executing an atomic operation using a VarHandle in block diagram form according to an embodiment.

FIG. 5 illustrates an example process for performing a constrained operation using a VarHandle in block diagram form according to an embodiment. For the purposes of this section, the class that utilizes the VarHandle will be referred to as the "acting class" and it will be assumed that the VarHandle is defined using the example VarHandle abstract class.

In the following example, FIG. 5 will be described in reference to a VarHandle that accesses an instance field of a class. An additional example of using the process of FIG. 5 for array access will be described later in Section 3.4.

At block 500, the virtual machine 104 receives a declaration of a VarHandle instance. In some embodiments, the virtual machine 104 receives a declaration of a VarHandle instance via the class files 103 which have been compiled from the source code files 101 for the acting class. In an embodiment, a VarHandle instance to a field "val" of type "Value" held by receiver "Receiver" could be declared using the following example source code,

```
VarHandle varHandleOfValueOnReceiver = VarHandles.lookup( )
.findFieldHandle(Receiver.class, "val", Value.class);
```

In an embodiment, VarHandles is a generator class that includes methods to return instances of various VarHandle sub-classes which implement the constrained operations for a particular access type. lookup( ) is a static method of class VarHandles that returns a lookup class which is utilized to return VarHandle subclass instances tied to a specified field (via the method findFieldHandle). For example, the VarHandle subclass instance generated by the lookup class may store descriptors for each method corresponding to the receiver and variable classes to which the VarHandle subclass instance is bound. In the above example declaration, findFieldHandle creates a VarHandle instance that accesses a field of a statically typed object of type Receiver named "val", where the field holds a statically typed object of type Value. Thus, for example, "–set" operations could be associated with the descriptor "(L Receiver L Value) V" and"–get" operations could be associated with the descriptor "(L Receiver) L Value" for the VarHandle assigned to varhandleOfValueOnReceiver.

As another example, in the case of a VarHandle to a static field of a class, the lookup class method may take the name of the class (or a Class object representing the class), the name of the static field within the class, and the class of the static field. In some embodiments, the lookup class performs access control checks to ascertain whether the acting class has the proper privileges to access the specified receiver and variable. For example, if the variable is declared private, classes outside the package defining the variable may not have sufficient privileges to access the variable, which would result in the lookup class generating an error. In some embodiments, access checks are performed when the VarHandle is created, rather than when a method of the VarHandle is invoked. In some cases, performing the access control check at lookup time reduces overhead by allowing the VarHandle to omit these access checks during invocation. As a result, in such embodiments, it is possible to pass the VarHandle to classes which otherwise would not have access permissions to the referenced receiver/variable. However, in some embodiments, the access checks may be performed again during invocation to prevent classes with inadequate permissions from invoking the VarHandle at the cost of less efficient run-time performance.

At block 501, the virtual machine 104 receives instruction of a constrained operation to perform using the VarHandle. For example, a volatile-set operation on varHandleOfValueOnReceiver may appear as follows,

```
Receiver r = . . .
Value v = . . .
varHandleOfValueOnReceiver.setVolatile(r, v)
```

where r is an instance of class Receiver, v is an instance of class Value, and the method setVolatile is invoked on varHandleOfValueOnReceiver using r and v as parameters. In an embodiment, when the compiler 102 constructs the class file 200 for the acting class the method reference structures 207 of the constant table 201 includes a reference to class VarHandle, the name of the method setVolatile and a symbolic method descriptor of "(L Receiver L Value) V" signifying a method that takes an object of type Receiver and an object of type Value as parameters and has a return type of void. Further, in the virtual machine 104 code the call is converted to an invoke instruction that specifies the index into the constant table 201 for the aforementioned method reference to setVolatile.

As another example, in the case of a VarHandle to a static field of a class, setVolatile may be implicitly bound to the class, obviating the need to explicitly specify the receiver. For instance, the call may appear as "varHandleOfValueOnReceiver.setVolatile(v)". During the declaration, the VarHandle is bound to a class/type of the receiver and, since this is static access, there is only one possible receiver (the class itself). Thus, unlike the instance field case, the VarHandle already knows the exact receiver upon which to act. Whereas, in the instance field case, the VarHandle is bound to the receiver's type/class, but not to any particular receiver instance. As a result, the instruction that calls to a particular constrained function/method indicates a receiver by being implicitly bound to a receiver (such as in the static case) or specifies the receiver (such as in the case of an instance field). Thus, a VarHandle that performs instance access is able to perform operations on any receiver instance passed into the call, provided the receiver matches the type to which the VarHandle is bound during declaration.

As another example, a volatile-get operation on varHandleOfValueOnReceiver may appear as follows:

```
Receiver r = . . .
Value v = (Value) varHandleOfValueOnReceiver.getVolatile(r);
```

Where r is an instance of Receiver, v is an instance of value, (Value) is a typecast on the return and getVolatile is invoked on varHandleOfValueOnReceiver using r as a parameter. In an embodiment, when the compiler 102 constructs the class file 200 for the acting class the method reference structures 207 of the constant table 201 includes a reference to class VarHandle, the name of the method getVolatile and a symbolic method descriptor of "(L Receiver) L Value" signifying a method that takes an object of type Receiver and returns an object of type Value. Further, in the virtual machine 104 code the call is converted to a invoke instruction that specifies the index into the constant table 201 for the aforementioned method reference to getVolatile. In some embodiments, getVolatile erases statically typed objects down to the most general form (type Object), thus the typecast on the return ensures that the compiler 102 can determine the return type for the symbolic method descriptor "(L Receiver)L Value. However, in other embodiments, the explicit type cast can be avoided if the compiler 102 can infer the return type from the local variable type on the left-hand-side of the expression (e.g. the compiler implements "target typing").

At block 502, the virtual machine 104 performs type safety checks for the constrained operation. In an embodiment, when an invocation instruction which references a polymorphic signature method is executed by the virtual machine 104, the linking step described above in Section 2.3 is replaced with a process referred to as "intrinsic linking". Under normal circumstances, using the volatile-set operation as an example, a linkage error would occur when the virtual machine 104 attempts to resolve the symbolic reference only to discover that no method is defined in class VarHandle matching the name setVolatile and the descriptor "(L Receiver L Value) V". However, in response to determining that the invoked method is signature polymorphic, the virtual machine 104 executes a predefined method associated with the access type of the invocation at the call site that performs a variety of type safety checks and executes the membername corresponding to the invoked method.

For example, polymorphic signature methods may be associated with a flag or a particular combination of attributes, such as setting the method as both final and native in the class file 200 of the VarHandle class. When invoking the method reference, the virtual machine 104 checks the flags to determine whether the method is signature polymorphic. If so, the virtual machine 104 calls a predefined method that is designed to handle the particular interface shape specified by the descriptor of the method reference. For example, the predefined method may erase classes down to generic Objects to cut down on the number of predefined methods by allowing different invocations that erase down to the same interface shape to use the same predefined method. Otherwise, the method is not signature polymorphic, and the virtual machine 104 proceeds with linking as described above in Section 2.3.

In some embodiments, the virtual machine 104 manipulates the operand stack 402 to provide additional information to the predefined method. For example, since the ordinary linking procedure is bypassed during intrinsic linking, there is no guarantee that the arguments provided to the invoked polymorphic signature method match the types specified during the VarHandle declaration. This could cause unexpected behavior, as the membername of the VarHandle instance invoked to perform the constrained operation might be relying on the size and/or access type of the receiver and variable classes specified during the VarHandle declaration. Upon invocation of the setVolatile method, the operand stack 402 would have pushed on it r, v, and varHandleofValueonReceiver. However, the virtual machine 104 may push additional data onto the stack, such a reference to the descriptor of the method reference structure indexed by the invocation instruction. Thus, in the predefined method, the virtual machine 104 can compare the descriptor stored by the VarHandle instance to the descriptor of the method invocation at the call site to ensure the argument and return types match those expected by the VarHandle instance's membername. If so, the predefined method invokes the membername to perform the constrained operation. Otherwise, an error is generated.

Thus, in some embodiments, intrinsic linking is performed in two parts (1) the virtual machine 104 automatically invokes a predefined method based on the erased descriptor of the method reference to perform type safety checks and (2) the virtual machine 104 invokes the membername of the VarHandle instance to perform the constrained operation. In some embodiments, during step (2), additional safety checks are performed, such as determining if the receiver is null or (in the case of an array access) determining whether the specified index is within bounds.

An example inlining trace of a volatile-set operation, when the handle is constant folded, is as follows:

```
@ 13 java.lang.invoke.VarHandle::setVolatile_LL_V (37 bytes)
inline (hot)
  @ 5 java.lang.invoke.VarHandle::checkExactType (18 bytes)
  inline (hot)
  @ 18 java.lang.invoke.FieldInstanceRefHandle::setVolatile (26
  bytes) inline (hot)
    @ 1 java.lang.Object::getClass (0 bytes) (intrinsic)
    @ 19 java.lang.invoke.MethodHandleImpl::castReference (20
    bytes) inline (hot)
      @ 6 java.lang.Class::isInstance (0 bytes) (intrinsic)
```

In addition, an example predefined method for setVolatile that handles the erased signature of "(L Object, L Object) V" may appear as follows,

```
@ForceInline
final static void setVolatile_LL_V(VarHandle handle, Object
    receiver, Object value, Object symbolicMethodType) {
  checkExactType(handle.typeSet, symbolicMethodType);
  try {
    MethodHandle.linkToStatic(handle, receiver, value,
      handle.vform.setVolatile);
  }
  catch (Throwable t) {
    throw new Error(t);
  }
}
```

In the example method setVolatile_LL_V, the first parameter is the handle which is an instance of class VarHandle, the second parameter is the receiver, the third parameter is the value, and the last parameter is a symbolic method descriptor. The example method setVolatile_LL_V first performs a method type descriptor check to determine whether the symbolic descriptor at the call site (the method call at the acting class) matches the call descriptor for "–set" operations stored by handle. If the descriptors do not match, an error is generated, such as throwing an exception to be caught by an exception handler. Otherwise, the MethodHandle.linkToStatic method is invoked with all the parameters except the symbolicMethodType added during the intrinsic linking to assist the predefined method. However, an additional parameter, handle.vform.setVolatile is added to the arguments, which represents the membername that implements the constrained operation. The try/catch block exists to catch exceptions that may be thrown by the MethodHandle.linkToStatic invocation. However, in other embodiments, the try/catch block can be avoided by utilizing an intrinsic linking method that avoids such declarations. In an embodiment, @ ForceInline is used on intrinsically linked methods, which informs the JIT compiler of the interpreter 108 to inline the method regardless of the maximum inline limit and method size.

At block 503, the virtual machine 104 links to the method code that implements the constrained operation. In an embodiment, the method MethodHandle.linkToStatic links the method characterized by the 'membername' associated with a volatile-set (in above example, handle.vform.setVolatile). Thus, MethodHandle.linkToStatic causes the virtual machine 104 to perform resolution, resolving the method reference to setVolatile in the acting class to the setVolatile method code of the sub-class handling the access type of the declared VarHandle. In this case, the example declaration used the lookup( ) method assigned to VarHandle subtype FieldInstanceRefHandle and thus linkToStatic links the reference to the method code of FieldInstanceRefHandle that implements the constrained operation setVolatile. An example of the linked code implementing setVolatile for field instance access is as follows:

```
@ForceInline
static void setVolatile(FieldInstanceRefHandle handle, Object
  receiver, Object value) {
    receiver.getClass( ); // null check
  UNSAFE.putObjectVolatile(receiver,
      (long) handle.fieldOffset,
      castReference(handle.fieldType, value));
}
```

The first parameter is the 'FieldInstanceRefHandle' instance and the subsequent parameters are those passed to the 'VarHandle.setVolatile' method. The 'FieldInstanceRefHandle' instance holds the field offset to be used with the invocation of 'Unsafe.putObjectVolatile'. Before that invocation: a safety check is performed to ensure the receiver instance is not 'null' (to avoid potential segmentation faults); and a cast check of the value is performed as an additional safety check.

At block 504, the virtual machine 104 executes the linked method code to perform the constrained operation. In the above example, the linked method code performs the set volatile operation via a call to Unsafe.putObjectVolatile, which stores value at the corresponding memory location in the specified constrained manner. For example, the virtual machine 104 may perform the constrained operation via one or more system calls to the operating system 110 or machine instructions presented to the processor of the underlying computer system. For example, to implement a memory fence operation, the virtual machine 104 may issue one or more memory barrier instructions natively supported by the underlying hardware in addition to loads and/or stores to the memory location of the variable. In some embodiments, the processor of the underlying computer hardware may not support native operations that perform the constrained operation. However, in such embodiments, the virtual machine 104 may cobble together multiple system calls or machine instructions that synthesize the same effect that the constrained operation would cause.

3.4 VarHandle Process Flow Array Example

The following is an example of the process flow of FIG. 5 applied to the case where the receiver is an array and the variable is a statically typed object. For the purposes of this section, the class that utilizes the VarHandle will be referred to as the "acting class" and it will be assumed that the VarHandle is defined using the example VarHandle abstract class.

At block 500, the virtual machine 104 receives a declaration of a VarHandle. In an embodiment, a VarHandle instance to an array element of component type 'Value' held by a receiver of array type 'Value[ ]' is declared using the following example source code,

```
VarHandle varHandleOfValueArray = VarHandles.
arrayHandle (Value [ ] . class) ;
```

where VarHandles.arrayHandle returns an instance of a VarHandle subclass implemented to handle array access.

At block 501, the virtual machine 104 receives an instruction to perform a constrained operation via the VarHandle. In an embodiment, a volatile-set operation on an array element Value v at index i of an instance of array type Value[ ] r is invoked via the following example source code:

```
Value[ ] r = . . .
int i = . . .
Value v = . . .
varHandleOfValueArray.setVolatile(r, i, v)
```

In an embodiment, the method reference to setVolatile(r, i, v) includes the method descriptor "(L Receiver I L Value)V", signifying that the method takes an object of type Receiver, an integer, and an object of type Value with a return type of void.

In an embodiment, a volatile-get operation to a Value v from an array element at index i on an instance of array type Value[ ] r is invoked by the following example source code:

```
Value[ ]r = . . .
int i = . . .
Value v = (Value)varHandleOfValueArray.getVolatile(r, i);
```

The corresponding symbolic method descriptor is "(L Receiver I) L Value", which matches the method type descriptor of the of the volatile-get operation.

At block 502, the virtual machine 104 performs type safety checks for the operation. In an embodiment, the invocation of 'VarHandle.setVolatile' intrinsically links to 'VarHandle.setVolatile_LIL_V':

```
@ForceInline
final static void setVolatile_LIL_V(VarHandle handle, Object[ ]
    holder, int index, Object value, Object
    symbolicMethodType) {
  checkExactType(handle.typeSet, symbolicMethodType);
  try {
    MethodHandle.linkToStatic(handle, holder, index,
      value, handle.vform.setVolatile);
  }
  catch (Throwable t) {
    throw new Error(t);
  }
}
```

In VarHandle.setVolatile_LIL_V the type safety checking is performed by checkExactType which ensures that the method descriptor of the handle matches the symbolicMethodType of the parameters/return value used at the call site.

In an embodiment, the invocation of 'MethodHandle.linkToStatic' links to the method characterized by the 'membername' associated with a volatile-set. In this case, the handle was generated via Varhandles.arrayHandle which returns the ArrayRefHandle subtype of VarHandle and thus the membername links to the array implementation of the setVolatile method. In an embodiment, an example implemention of the linked method is as follows:

```
@ForceInline
static void setVolatile(ArrayRefHandle handle, Object[ ] array,
    int index, Object value) {
  if (index < 0 | | index >= array.length) // bounds & null ck
    throw new ArrayIndexOutOfBoundsException( );
  UNSAFE.putObjectVolatile(array,(((long) index) <<
      handle.ashift) +
      handle.abase,castReference(handle.componentType,
      value));
}
```

The 'ArrayRefHandle' instance holds the array base offset and array shift to calculate, from the index, the offset to be used with the invocation of 'Unsafe.putObjectVolatile'. Before that invocation: safety checks are performed to ensure the array is not 'null' and the index is within the array bounds.

3.5 Optimizations

In an embodiment, the virtual machine 104 performs optimizations for VarHandles to reduce the burden imposed due to the intrinsic linking, type checks, and safety checks.

As one example, an optimization that may be performed by the virtual machine 104 is "constant folding". Constant folding is an optimization technique that evaluates expressions involving constants at compile time, rather than during execution. Thus, for example, the interpreter 108/JIT compiler may replace instructions that evaluate constants with instructions storing the result. For instance, "i=100+105+109" would ordinarily push values on the stack and perform invocations of the add instruction. However, the virtual machine 104 may instead evaluate the expression ahead of time and replace the instructions with a single instruction that loads "314" into local variable i. Thus, when virtual machine 104 instructions are converted into machine code for execution, the run-time speed increases due to performing fewer and simpler operations.

As another example, an optimization that may be performed by the virtual machine 104 is "in-lining" or "inline expansion". During inlining the virtual machine 104 or a component thereof (such as the interpreter 108/JIT compiler), replaces a method invocation at a call cite with the body of the called method. Thus, the virtual machine 104 bypasses the overhead of processing the invocation and jumping execution from the body of one method to another. In an embodiment, when the virtual machine 104 intrinsically links the call to a constrained operation on a VarHandle, the virtual machine 104 may optimize by inlining some or all of the code that executed during the intrinsic linking.

As another example, an optimization that may be performed by the virtual machine 104 is caching the resolved VarHandle invocation and reusing that memory location for future invocations. Assuming the fields of the VarHandle that identify the bound receiver and variable types are static, the access permission check during lookup and the type safety check performed by the predefined method do not need to be performed again. Thus, the next time the same VarHandle method is invoked those checks can be skipped, resulting in runtime performance that is nearly on par with directly exposing the "unsafe" method.

As another example, an embodiment can declare a reference to a VarHandle as a constant value that cannot be changed once set. For example, in Java some implementations use the "static final" attributes to define such a field. Thus, using the Java example, a static final ref to a VarHandle instance "V" is considered constant, thus any final instance field on a class that can be traced back via a chain of reference dependencies to V is also considered constant. As a result, when the virtual machine 104 inlines a method call to V, the virtual machine 104 can constant fold away the instructions associated with the type checking, the link-to-static call can be inlined (since the last argument is known to be constant), and the explicit cast checks fold away as well.

3.6 Relaxing the Return Type on Polymorphic Signature Methods

In some embodiments, the return type of polymorphic signature methods, such as those used in the previous VarHandle examples, can be relaxed such that if the type is not a generic Object then that type is the return type encoded into the symbolic type descriptor for the method. For instance, in the illustrative embodiment, the VarHandle class may be modified to declare relaxed polymorphic signature methods, such that all set-based methods return 'void' and the compare-and-set method returns 'boolean'. As a result, in some instances, the typecasting in the above examples may be avoided since the return type could be inferred from the method signature. Example source code representing the relaxed polymorphic method signature for VarHandle follows in part,

```
abstract class VarHandle {
. . .
public final native
@MethodHandle.PolymorphicSignature
void set(Object. . . args);
. . .
public final native
@MethodHandle.PolymorphicSignature
boolean compareAndSet(Object. . . args);
. . .
}
```

3.7 Generic Polymorphic Signature Methods

In an embodiment, the relaxing of the types of polymorphic signature methods is extended in exchange for declaring one abstract class per receiver type. Thus, such an abstract class would be able to support both primitive and reference value types.

In an embodiment, instead of one VarHandle abstract class, three classes are defined corresponding to each type of receiver:

'StaticFieldHandle<R, V>' for static field access

'FieldHandle<R, V>' for instance field access; and

'ArrayHandle<R, I, V>' for array element access.

Type variables are declared for the receiver R and the value V. In addition for array access there is a type variable for the index I into the array. In some embodiments, the type variable I ensures access to elements in large arrays can be supported for indexes greater than a maximum integer value defined by the virtual machine 104. Furthermore, the receiver for an array, as with VarHandle, may be an array class, or could be some other type for an array-like structure, such as access to off-heap memory.

In some embodiments where static field access is likely to be rare, such access can be folded into 'FieldHandle<R, V>' where constrained access methods accept a null value or ignore the value of the receiver. Thus, a null value for the receiver may act as a flag indicating whether to use static field access or instance field access for the declared VarHandle. As a result, the number of classes can be reduced at the expense of additional processing to determine whether static or field access is being performed.

In some embodiments, the above described classes could extend from VarHandle to retain the lower-level but more general mechanism, since methods on the sub-class will essentially override those of the super class.

In an embodiment, the mechanism by which methods are intrinsically linked for constrained operations remains identical to that previously described in Section 3.3 and thus the performance will remain relatively on par with the VarHandle examples. However, in some cases, the usability may be enhanced, as more errors are likely to be caught at compile time rather than runtime since invocations on a signature polymorphic method, in some implementations, might be compiled by the compiler 102 without regard to whether the descriptor for that invocation leads to a valid implementing method.

Consider the following example code for invocations on a FieldHandle that accesses an int field on an instance of type Receiver:

```
FieldHandle<Receiver, Integer> fh = . . .
int a = 1;
int b = 2;
fh.compareAndSet(this, 1, 2);
Integer ba = a;
Integer bb = b;
fh.compareAndSet(this, ba, bb);
```

In the example, the primitive type is represented as a boxed type. Packaging a primitive value in an object representing the primitive value is referred to as "boxing". By the same token, unpacking a boxed value back to the primitive form is referred to as "unboxing". In some embodiments, primitive types, such as ints, bytes, chars, longs, etc., cannot be erased to a more generic form. However, the boxed form can be erased to a generic Object. Thus, by boxing the primitive values, the primitive values can be generified.

In some embodiments, the first 'compareAndSet' operations compiles to the following example virtual machine 104 code,

```
10: invokevirtual #2 // Method
java/lang/invoke/FieldHandle.compareAndSet: (LVarHandleTest; II)Z
```

and the second to:

```
32: invokevirtual #4 // Method
java/lang/invoke/FieldHandle.compareAndSet:(LVarHandleTest;Ljava/
lang/Integer;Ljava/lang
```

where the first numbers ("10"/"32") represent the index of the virtual machine 104 code, invoke virtual is the command invoking an instance method which takes an argument indicating the index of the method reference in the constant table 201, and the comment contains the fully qualified path name of the class containing the method and a descriptor of the method being invoked.

Since primitive type 'int' is compatible with its boxed type 'Integer', the compiler 102 will successfully compile the first invocation and therefore the symbolic method descriptor will be equal to the method descriptor of the compare-and-set operation (e.g. in cases where the method is signature polymorphic, the compiler 103 will verify that 'int' is convertible to 'Integer', but will not generate the boxing instructions). For the second invocation the symbolic method descriptor will differ and therefore could result in a runtime exception. However, the invoke-exact semantics could be relaxed to instead perform transformations on the arguments to make the descriptor at the call site match the descriptor for the compare-and-set operation. For example, values could be automatically boxed or unboxed before and/or after basic invocation is performed.

In some embodiments, the transformations are extended to the receiver type and/or non-primitive value types, such as strings being converted from arrays of chars. In addition, in some embodiments, the compiler 102 encodes the class of the type parameter, if known, into the symbolic method descriptor rather than a possible sub-type.

In an embodiment, one or more of the methods of a VarHandle instance are defined to have a generic signature, and the virtual machine 104 reifies the generic signature at the call sites for some or all of the methods of the VarHandle instance in, for instance, compiled Java bytecode.

For example, consider the following Java code:

```
public class Test {
  static class Receiver {
    Value v;
  }
  static class Value {
  }
  static abstract class FieldHandle<R, V> {
    abstract boolean compareAndSet(R r, V a, V e);
  }
  public static void main(String[ ] args) {
    FieldHandle<Receiver, Value> fh = null;
    Receiver r = new Receiver( );
    Value a = new Value( );
    Value e = new Value( );
    fh.compareAndSet(r, a, e); // types are erased
  }
}
```

The invocation of fh.compareAndSet in the above class may be compiled to the following instruction:

```
32: invokevirtual #6 // Method
Test$FieldHandle.compareAndSet:(Ljava/lang/Object;Ljava/lang/Obje
ct;Ljava/lang/Object;)Z
```

In the above example, parameters types associated with type variables 'R' and 'V', in this case instances of Receiver and Value for the invocation, are erased to a generic Object. In embodiments where reifying the generic signature is implemented, Receiver and Value may be captured at the call site rather than erasing them, and an efficient pointer equality check can be performed of the method signature at the call site (symbolic type descriptor) with the expected method type descriptor (just like in the polymorphic signature case) before proceeding further in the knowledge that the types of the parameters passed to the method are correct.

3.8 Consolidation of Code VarHandles and Method Handles

In some embodiments, in addition to VarHandles the virtual machine implements another access structure referred to as a MethodHandle that acts as a handle on a particular method. An example of a MethodHandle implementation can be found at the public Java documentation (http://docs.oracle.com/javase/8/docs/api/java/lang/invoke/MethodHandle.html)

As with VarHandles, some embodiments of MethodHandles utilize polymorphic signatures and intrinsic linking. For example, invoking the method to which a MethodHandle is bound may be performed using .invoke([Parameters]) on a MethodHandle instance declared to a particular method using a lookup class. The invocation intrinsically links to a LamdaForm of the MethodHandle, which essentially acts as a wrapper to the implementing method and performs various actions and/or checks before invoking the implementing method.

In some embodiments, instead of VarHandles holding a Varform, the VarHandles hold a collection of LambdaForms corresponding to the different constrained operation methods. As a result, 'VarForm' instances can be cached and shared between VarHandle and MethodHandle instances. Furthermore, common 'VarForm' instances can be statically defined and therefore reduce startup costs. The LambdaForm essentially acts as a box to the membername, whose reference can be updated. An update can occur when a LamdaForm switches from interpreted to compiled (via the compiler 102). Specifically for static field access, the membername points to an implementation that checks if the class needs to be initialized (and if so does so), accesses the static field, and then updates the membername to an implementation that does not perform static access and just accesses the field. Furthermore, some embodiments may implement methods for VarHandles that returns a MethodHandle to a particular constrained operation.

In some embodiments, as an alternative, field-based direct method handles referring to methods on a VarHandle instance could be generated to reduce the quantity of spinning classes at the expense of a new form of class spinning.

3.9 Memory Fences

A memory fence is a type of barrier instruction which causes a processor, such as a CPU, or a compiler to enforce an ordering constraint on memory operations issued before and after the barrier instruction. Thus, operations issued prior to the barrier are guaranteed to be performed before operations issued after the instruction. One reason that memory fences are employed is due to the fact that CPUs and compilers often employ performance optimizations that can result in out-of-order execution. For a single thread of execution, the optimizations are usually designed to ensure that the semantics of the program are undisturbed, such as omitting a load instruction for data that is never actually used by the program or retrieving a value from a buffer or cache instead of main memory. However, for multi-threaded programs the reordering of memory operations can cause unpredictable behavior unless carefully controlled. A memory fence does not necessarily store or load data to a memory location, but instead controls when values can be read from the buffer/cache and when the buffer/cache should be flushed to main memory.

Virtually all processors support at least a general barrier instruction that guarantees that all loads and stores initiated before the fence will be strictly ordered before any load or store initiated after the fence. However, many processors also support more fine-grained barriers that provide fewer ordering guarantees, but often cause less overhead.

In an embodiment, the virtual machine 104 supports VarHandles that can access the various fencing operations of the underlying hardware architecture (or a virtualized software construct, such as the virtual machine 104). For example, a VarHandle may be extended to include additional methods which, instead of calling an "unsafe" method that performs an atomic operation, intrinsically link to a membername that issues barrier instructions. The exact barrier instructions supported by the VarHandle may be governed by the underlying architecture of the hardware. For example, the underlying processor or multi-processor may support a machine-level instruction that is equivalent to the desired memory fence. However, in other embodiments, the underlying hardware may not support the desired memory fence. As a result, in some embodiments, the virtual machine 104 synthesizes the memory fence operation by implementing the fence in software, essentially using a combination of other machine-level instructions to achieve the same effect.

The following are a few examples of memory fences that may be access via a VarHandle.

(1) LoadLoad Barrier—Sequence (Load1; LoadLoad; Load2), ensures that Load1's data are loaded before data accessed by Load2 and all subsequent load instructions are loaded. In some embodiments, LoadLoad barriers are used for processors that perform speculative loads and/or out-of-order processing in which waiting load instructions can bypass waiting stores.

(2) StoreStore Barrier—Sequence (Store1; StoreStore; Store2), ensures that Store1's data are visible to other processors before the data associated with Store2 and all subsequent store instructions. For example, StoreStore barriers are often used on processors that do not otherwise guarantee strict ordering of flushes from write buffers and/or caches to other processors or main memory.

(3) LoadStore Barrier—Sequence (Load1; LoadStore; Store2)—ensures that Load1's data are loaded before all data associated with Store2 and all subsequent store instructions. For example, StoreStore barriers are often used on processors that do not otherwise gurantee strict ordering of flushes from write buffers and/or caches to other processors or main memory.

(4) StoreLoad Barriers—Sequence (Store1; StoreLoad; Load2)—ensures that Store1's data are made visible to other processors before data accessed by Load2 and all subsequent load instructions are loaded. StoreLoad barriers protect against a subsequent load incorrectly using Store1's data value rather than that from a more recent store to the same location performed by a different processor.

In some embodiments, the virtual machine 104 synthesizes fences using supported barrier instructions in situations where the underlying hardware does not support the fence natively. For example, assume that the underlying hardware does not provide native support for release-set and acquire-get lazy operations, but supports the example barrier instructions listed above. An acquire fence could be synthesized by combining a load-load barrier instruction with a load-store barrier instruction and a release fence could be synthesized by combining a store-load barrier instruction with a store-store barrier instruction. In some embodiments, the aforementioned acquire/release fences can then be issued to the hardware and/or used to to implement the release-set/acquire-get lazy fenced operations.

3.10 Extensions of VarHandle Functionality

Although VarHandles have been described as providing efficient and safe access to atomic operations and memory barrier instructions, VarHandles are not limited to these functionalities. In other embodiments, VarHandles could be extended to provide access to virtually any type of functionality, such as hardware features that do not fall within the categories of atomic operations and memory barrier instructions.

4.0 Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

Figure 6:
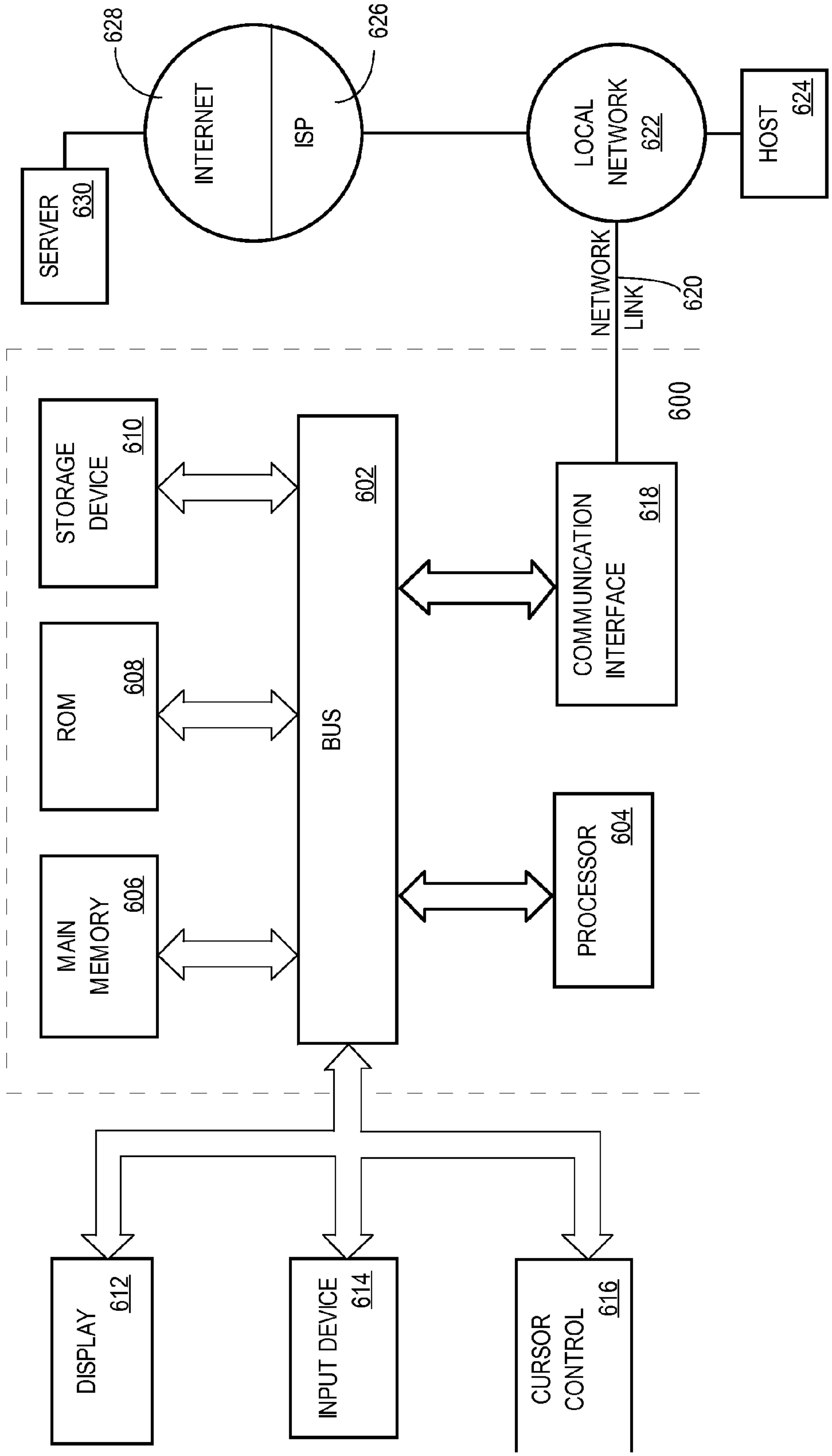
FIG. 6 is a block diagram illustrating one embodiment of a computer system suitable for implementing methods and features described herein.

For example, FIG. 6 is a block diagram that illustrates a computer system 600 upon which an embodiment of the invention may be implemented. Computer system 600 includes a bus 602 or other communication mechanism for communicating information, and a hardware processor 604 coupled with bus 602 for processing information. Hardware processor 604 may be, for example, a general purpose microprocessor.

Computer system 600 also includes a main memory 606, such as a random access memory (RAM) or other dynamic storage device, coupled to bus 602 for storing information and instructions to be executed by processor 604. Main memory 606 also may be used for storing temporary variables or other intermediate information during execution of instructions to be executed by processor 604. Such instructions, when stored in non-transitory storage media accessible to processor 604, render computer system 600 into a special-purpose machine that is customized to perform the operations specified in the instructions.

Computer system 600 further includes a read only memory (ROM) 608 or other static storage device coupled to bus 602 for storing static information and instructions for processor 604. A storage device 610, such as a magnetic disk, optical disk, or solid-state drive is provided and coupled to bus 602 for storing information and instructions.

Computer system 600 may be coupled via bus 602 to a display 612, such as a light emitting diode (LED) display, for displaying information to a computer user. An input device 614, including alphanumeric and other keys, is coupled to bus 602 for communicating information and command selections to processor 604. Another type of user input device is cursor control 616, such as a mouse, a trackball, or cursor direction keys for communicating direction information and command selections to processor 604 and for controlling cursor movement on display 612. This input device typically has two degrees of freedom in two axes, a first axis (e.g., x) and a second axis (e.g., y), that allows the device to specify positions in a plane.

Computer system 600 may implement the techniques described herein using customized hard-wired logic, one or more ASICs or FPGAs, firmware and/or program logic which in combination with the computer system causes or programs computer system 600 to be a special-purpose machine. According to one embodiment, the techniques herein are performed by computer system 600 in response to processor 604 executing one or more sequences of one or more instructions contained in main memory 606. Such instructions may be read into main memory 606 from another storage medium, such as storage device 610. Execution of the sequences of instructions contained in main memory 606 causes processor 604 to perform the process steps described herein. In alternative embodiments, hard-wired circuitry may be used in place of or in combination with software instructions.

The term "storage media" as used herein refers to any non-transitory media that store data and/or instructions that cause a machine to operate in a specific fashion. Such storage media may comprise non-volatile media and/or volatile media. Non-volatile media includes, for example, optical disks, magnetic disks, or solid-state drives, such as storage device 610. Volatile media includes dynamic memory, such as main memory 606. Common forms of storage media include, for example, a floppy disk, a flexible disk, hard disk, solid-state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 602. Transmission media can also take the form of acoustic or light waves, such as those generated during radio-wave and infra-red data communications.

Various forms of media may be involved in carrying one or more sequences of one or more instructions to processor 604 for execution. For example, the instructions may initially be carried on a magnetic disk or solid-state drive of a remote computer. The remote computer can load the instructions into its dynamic memory and send the instructions over a telephone line using a modem. A modem local to computer system 600 can receive the data on the telephone line and use an infra-red transmitter to convert the data to an infra-red signal. An infra-red detector can receive the data carried in the infra-red signal and appropriate circuitry can place the data on bus 602. Bus 602 carries the data to main memory 606, from which processor 604 retrieves and executes the instructions. The instructions received by main memory 606 may optionally be stored on storage device 610 either before or after execution by processor 604.

Computer system 600 also includes a communication interface 618 coupled to bus 602. Communication interface 618 provides a two-way data communication coupling to a network link 620 that is connected to a local network 622. For example, communication interface 618 may be an integrated services digital network (ISDN) card, cable modem, satellite modem, or a modem to provide a data communication connection to a corresponding type of telephone line. As another example, communication interface 618 may be a local area network (LAN) card to provide a data communication connection to a compatible LAN. Wireless links may also be implemented. In any such implementation, communication interface 618 sends and receives electrical, electromagnetic or optical signals that carry digital data streams representing various types of information.

Network link 620 typically provides data communication through one or more networks to other data devices. For example, network link 620 may provide a connection through local network 622 to a host computer 624 or to data equipment operated by an Internet Service Provider (ISP) 626. ISP 626 in turn provides data communication services through the world wide packet data communication network now commonly referred to as the "Internet" 628. Local network 622 and Internet 628 both use electrical, electromagnetic or optical signals that carry digital data streams. The signals through the various networks and the signals on network link 620 and through communication interface 618, which carry the digital data to and from computer system 600, are example forms of transmission media.

Computer system 600 can send messages and receive data, including program code, through the network(s), network link 620 and communication interface 618. In the Internet example, a server 630 might transmit a requested code for an application program through Internet 628, ISP 626, local network 622 and communication interface 618.

The received code may be executed by processor 604 as it is received, and/or stored in storage device 610, or other non-volatile storage for later execution.

As used herein, the terms "first," "second," "certain," and "particular" are used as naming conventions to distinguish queries, plans, representations, steps, objects, devices, or other items from each other, so that these items may be referenced after they have been introduced. Unless otherwise specified herein, the use of these terms does not imply an ordering, timing, or any other characteristic of the referenced items.

5.0 Extensions and Alternatives

In the foregoing specification, embodiments of the invention have been described with reference to numerous specific details that may vary from implementation to implementation. Thus, the sole and exclusive indicator of what is the invention, and is intended by the applicants to be the invention, is the set of claims that issue from this application, in the specific form in which such claims issue, including any subsequent correction. Any definitions expressly set forth herein for terms contained in such claims shall govern the meaning of such terms as used in the claims. Hence, no limitation, element, property, feature, advantage or attribute that is not expressly recited in a claim should limit the scope of such claim in any way. The specification and drawings are, accordingly, to be regarded in an illustrative rather than a restrictive sense.

6.0 Additional Disclosure

Aspects of the subject matter described herein are set out in the following numbered clauses:

1. A method comprising: identifying a first instruction to create a variable handle instance, the first instruction including declaration information that identifies a type of a receiver and a variable held by the receiver to which the variable handle instance is configured to provide access; responsive to the first instruction, and based on the declaration information, performing one or more checks to determine whether access to the variable is permissible; in response to a determination that access to the variable is permissible, creating the variable handle instance, the variable handle instance comprising one or more constrained functions configured to execute constrained operations on a memory location of the variable; identifying a second instruction that specifies a call to a particular constrained function of the one or more constrained functions of the variable handle instance, wherein the second instruction indicates the receiver; and identifying a particular memory location where the variable is stored and causing performance of the particular constrained function with respect to the particular memory location.

2. The method of Clause 1, wherein the receiver is a class and the variable is a static field held by the class, the receiver is a class instance and the variable is a field held by the class instance, the receiver is an array and the variable is an element of the array, or the receiver is a reference to an off-heap or direct memory location representing the variable.

3. The method of any of Clauses 1-2, wherein the first instruction calls a lookup function that causes the variable handle instance to store an offset of the variable within the receiver and binds the one or more constrained functions of the variable handle instance to one or more descriptors that identify a type of the receiver and a type of the variable.

4. The method of any of Clauses 1-3, wherein the method is performed by a virtual machine managing a first memory area and the instance of the variable is stored in a second memory area that is external to the first memory area managed by the virtual machine.

5. The method of any of Clauses 1-4, wherein the first instruction is derived from a particular class and determining whether access to the variable held by the receiver is permissible is based on whether the particular class has permission to access the variable held by the receiver.

6. The method of any of Clauses 1-5, further comprising in response to determining that access to the variable held by the receiver is not permissible, generating an access error.

7. The method of any of Clauses 1-6, wherein the method is performed by a virtual machine and virtual machine performs the constrained operations by generating machine code instructions supported by hardware upon which the virtual machine is executing.

8. The method of Clause 7, wherein the constrained operations include at least one constrained operation that is not natively supported by the hardware and further comprising synthesizing the constrained operation using a collection of machine code instructions supported by the hardware.

9. The method of any of Clauses 1-8, wherein the constrained operations perform one or more of: relaxed operations, volatile operations, lazy operations, compare-and-set operations, or get-and-set operations.

10. The method of any of Clauses 1-9, wherein the second instruction comprises one or more parameters for the particular constrained function.

11. The method of Clause 10, wherein the one or more parameters include one or more of: an array index into the instance of the receiver at which the instance of the variable is located or a value to store to the particular memory location of the instance of the variable.

12. The method of any of Clauses 1-11, further comprising: performing a check to ensure that the instance of the receiver specified by the second instruction matches a type of the receiver identified by the declaration information.

13. The method of any of Clauses 1-12, wherein causing performance of the particular constrained function with respect to the particular memory location comprises calling a function that interacts with arbitrary memory locations via one or more hardware instructions.

14. The method of any of Clauses 1-13, wherein the function that interacts with arbitrary memory locations does not perform type checking.

15. The method of any of Clauses 1-14, wherein the one or more constrained functions of the variable handle instance include functions corresponding to one or more atomic arithmetic operations.

16. The method of any of Clauses 1-15, wherein the variable handle instance is derived from a variable handle sub-class that extends an abstract variable handle class, the abstract variable handle class providing one or more interfaces for the one or more constrained functions and the variable handle sub-class implementing the one or more constrained functions with respect to a particular access type.

17. The method of Clause 16, further comprising: in response to a determination that the particular constrained function called by the second instruction is signature polymorphic, automatically invoking a predefined function based on a descriptor of a reference representing the call to the particular constrained function, wherein the predefined function performs a type check and invokes the function of the variable handle that performs the particular constrained function.

18. The method of Clause 17, wherein determining that the particular constrained function is signature polymorphic is performed by checking one or more flag associated with the particular constrained function in a run-time representation of the abstract variable handle class.

19. The method of any of Clauses 17-18, wherein the type check is performed by comparing one or more parameters and a return type of the call to the particular constrained function to a descriptor associated with the particular constrained function for the variable handle instance as a result of creating the variable handle instance based on the declaration information.

20. The method of any of Clauses 17-19, wherein invoking the particular constrained function of the variable handle instance includes at least resolving a symbolic reference to the particular constrained function in a constant pool to a concrete memory reference representing a location of the particular constrained function in run-time memory.

21. The method of Clause 20, further comprising caching the location of the particular constrained function in run-time memory to reuse during a future call to the particular constrained function of the variable handle instance.

22. The method of any of Clauses 17-20, wherein the particular constrained function of the variable handle instance at least performs one or more safety checks which, if successful, cause invoking an unsafe function that accesses the particular memory location and performs constrained operations corresponding to the particular constrained function.

23. A non-transitory computer-readable storage medium storing one or more instructions which, when executed by one or more processors, cause the one or more processors to perform steps comprising: identifying a first instruction to create a variable handle instance, the first instruction including declaration information that identifies a type of a receiver and a variable held by the receiver to which the variable handle instance is configured to provide access; responsive to the first instruction, and based on the declaration information, performing one or more checks to determine whether access to the is permissible; in response to a determination that access to the variable is permissible, creating the variable handle instance, the variable handle instance comprising one or more constrained functions configured to execute constrained operations on a memory location of the variable; identifying a second instruction that specifies a call to a particular constrained function of the one or more constrained functions of the variable handle instance, wherein the second instruction indicates the receiver; and identifying a particular memory location where the variable is stored and causing performance of the particular constrained function with respect to the particular memory location.

24. The non-transitory computer-readable medium of Clause 23, wherein the receiver is a class and the variable is a static field held by the class, the receiver is a class instance and the variable is a field held by the class instance, the receiver is an array and the variable is an element of the array, or the receiver is a reference to an off-heap or direct memory location representing the variable.

25. The non-transitory computer-readable medium of any of Clauses 23-24, wherein the first instruction calls a lookup function that causes the variable handle instance to store an offset of the variable within the receiver and binds the one or more constrained functions of the variable handle instance to one or more descriptors that identify a type of the receiver and a type of the variable.

26. The non-transitory computer-readable medium of any of Clauses 23-25, wherein the steps are performed by a virtual machine managing a first memory area and the instance of the variable is stored in a second memory area that is external to the first memory area managed by the virtual machine.

27. The non-transitory computer-readable medium of any of Clauses 23-26, wherein the first instruction is derived from a particular class and determining whether access to the variable held by the receiver is permissible is based on whether the particular class has permission to access the variable held by the receiver.

28. The non-transitory computer-readable medium of any of Clauses 23-27, wherein the steps further comprise in response to determining that access to the variable held by the receiver is not permissible, generating an access error.

29. The non-transitory computer-readable medium of any of Clauses 23-28, wherein the steps are performed by a virtual machine and virtual machine performs the constrained operations by generating machine code instructions supported by hardware upon which the virtual machine is executing.

30. The non-transitory computer-readable medium of claim 29, wherein the constrained operations include at least one constrained operation that is not natively supported by the hardware and further comprising synthesizing the constrained operation using a collection of machine code instructions supported by the hardware.

31. The non-transitory computer-readable medium of any of Clauses 23-30, wherein the constrained operations perform one or more of: relaxed operations, volatile operations, lazy operations, compare-and-set operations, or get-and-set operations.

32. The non-transitory computer-readable medium of any of Clauses 23-31, wherein the second instruction comprises one or more parameters for the particular constrained function.

33. The non-transitory computer-readable medium of Clause 32, wherein the one or more parameters include one or more of: an array index into the instance of the receiver at which the instance of the variable is located or a value to store to the particular memory location of the instance of the variable.

34. The non-transitory computer-readable medium of any of Clauses 23-33, wherein the steps further comprise performing a check to ensure that the instance of the receiver specified by the second instruction matches a type of the receiver identified by the declaration information.

35. The non-transitory computer-readable medium of any of Clauses 23-34, wherein causing performance of the particular constrained function with respect to the particular memory location comprises calling a function that interacts with arbitrary memory locations via one or more hardware instructions.

36. The non-transitory computer-readable medium of any of Clauses 23-35, wherein the function that interacts with arbitrary memory locations does not perform type checking.

37. The non-transitory computer-readable medium of any of Clauses 23-36, wherein the one or more constrained functions of the variable handle instance include functions corresponding to one or more constrained arithmetic operations.

38. The non-transitory computer-readable medium of any of Clauses 23-37, wherein the variable handle instance is derived from a variable handle sub-class that extends an abstract variable handle class, the abstract variable handle class providing one or more interfaces for the one or more constrained functions and the variable handle sub-class implementing the one or more constrained functions with respect to a particular access type.

39. The non-transitory computer-readable medium of Clause 38, wherein the steps further comprise: in response to a determination that the particular constrained function called by the second instruction is signature polymorphic, automatically invoking a predefined function based on a descriptor of a reference representing the call to the particular constrained function, wherein the predefined function performs a type check and invokes the function of the variable handle that performs the particular constrained function.

40. The non-transitory computer-readable medium of Clause 39, wherein determining that the particular constrained function is signature polymorphic is performed by checking one or more flag associated with the particular constrained function in a run-time representation of the abstract variable handle class.

41. The non-transitory computer-readable medium of any of Clauses 39-40, wherein the type check is performed by comparing one or more parameters and a return type of the call to the particular constrained function to a descriptor associated with the particular constrained function for the variable handle instance as a result of creating the variable handle instance based on the declaration information.

42. The non-transitory computer-readable medium of any of Clauses 39-41, wherein invoking the particular constrained function of the variable handle instance includes at least resolving a symbolic reference to the particular constrained function in a constant pool to a concrete memory reference representing a location of the particular constrained function in run-time memory.

43. The non-transitory computer-readable medium of any of Clause 42, wherein the steps further comprise: caching the location of the particular constrained function in run-time memory to reuse during a future call to the particular constrained function of the variable handle instance.

44. The non-transitory computer-readable medium of any of Clauses 39-42, wherein the particular constrained function of the variable handle instance at least performs one or more safety checks which, if successful, cause invoking an unsafe function that accesses the particular memory location and performs constrained operations corresponding to the particular constrained function.

45. The non-transitory computer-readable medium of any of Clauses 23-29, wherein the steps further comprise: identifying a third instruction that specifies a second call to a second particular constrained function of the one or more constrained functions of the variable handle instance, the third instruction specifying a second receiver that shares the type of the receiver; and identifying a second particular memory location where the variable is held by the second receiver and causing performance of the second particular constrained function with respect to the second particular memory location.

46. The method of any of Clauses 1-16, further comprising: identifying a third instruction that specifies a second call to a second particular constrained function of the one or more constrained functions of the variable handle instance, the third instruction specifying a second receiver that shares the type of the receiver; and identifying a second particular memory location where the variable is held by the second receiver and causing performance of the second particular constrained function with respect to the second particular memory location.

What is claimed is:

1. A method comprising:

identifying a first instruction to create a variable handle instance, the first instruction including declaration information that identifies a type of a receiver and a variable held by the receiver to which the variable handle instance is configured to provide access, wherein the first instruction is received from an acting class;

responsive to the first instruction, and based on the declaration information, performing one or more checks to determine whether access to the variable by the acting class is permissible;

in response to a determination that access to the variable is permissible, creating the variable handle instance, the variable handle instance comprising one or more constrained functions configured to execute one or more constrained operations on a memory location of the variable, wherein the one or more constrained operations include one or more of: atomic operations or memory fenced operations;

identifying a second instruction that specifies a call to a particular constrained function of the one or more constrained functions of the variable handle instance, wherein the second instruction indicates the receiver; and identifying a particular memory location where the variable is stored and causing performance of the particular constrained function with respect to the particular memory location.

2. The method of claim 1, wherein the receiver is a class and the variable is a static field held by the class, the receiver is a class instance and the variable is a field held by the class instance, the receiver is an array and the variable is an element of the array, or the receiver is a reference to an off-heap or direct memory location representing the variable.

3. The method of claim 1, wherein the first instruction calls a lookup function that causes the variable handle instance to store an offset of the variable within the receiver and binds the one or more constrained functions of the variable handle instance to one or more descriptors that identify a type of the receiver and a type of the variable.

4. The method of claim 1, wherein the method is performed by a virtual machine managing a first memory area and the variable is stored in a second memory area that is external to the first memory area managed by the virtual machine.

5. The method of claim 1, further comprising:

identifying a third instruction that specifies a second call to a second particular constrained function of the one or more constrained functions of the variable handle instance, the third instruction specifying a second receiver that shares the type of the receiver; and identifying a second particular memory location where the variable is held by the second receiver and causing performance of the second particular constrained function with respect to the second particular memory location.

6. The method of claim 1, wherein the method is performed by a virtual machine and the virtual machine performs the one or more constrained operations by generating machine code instructions supported by hardware upon which the virtual machine is executing.

7. The method of claim 6, wherein the one or more constrained operations include at least one constrained operation that is not natively supported by the hardware and further comprising synthesizing the constrained operation using a collection of machine code instructions supported by the hardware.

8. The method of claim 1, wherein the one or more constrained operations perform one or more of: relaxed operations, volatile operations, lazy operations, compare-and-set operations, or get-and-set operations.

9. The method of claim 1, wherein the second instruction comprises one or more parameters for the particular constrained function and the one or more parameters include one or more of: an array index into the the receiver at which the variable is located or a value to store to the particular memory location of the variable.

10. The method of claim 1, further comprising: performing a check to ensure that the the receiver specified by the second instruction matches the type of the receiver identified by the declaration information.

11. The method of claim 1, wherein causing performance of the particular constrained function with respect to the particular memory location comprises calling a function that interacts with arbitrary memory locations via one or more hardware instructions.

12. The method of claim 11, wherein the function that interacts with arbitrary memory locations does not perform type checking.

13. The method of claim 1, wherein the one or more constrained functions of the variable handle instance include functions corresponding to one or more atomic arithmetic operations.

14. The method of claim 1, wherein the variable handle instance is derived from a variable handle sub-class that extends an abstract variable handle class, the abstract variable handle class providing one or more interfaces for the one or more constrained functions and the variable handle sub-class implementing the one or more constrained functions with respect to a particular access type.

15. The method of claim 14, further comprising: in response to a determination that the particular constrained function called by the second instruction is signature polymorphic, automatically invoking a predefined function based on a descriptor of a reference representing the call to the particular constrained function, wherein the predefined function performs a type check and invokes the particular constrained function of the variable handle instance.

16. A non-transitory computer-readable medium storing one or more instructions which, when executed by one or more processors, cause the one or more processors to perform steps comprising:

identifying a first instruction to create a variable handle instance, the first instruction including declaration information that identifies a type of a receiver and a variable held by the receiver to which the variable handle instance is configured to provide access, wherein the first instruction is received from an acting class;

responsive to the first instruction, and based on the declaration information, performing one or more checks to determine whether access to the variable by the acting class is permissible;

in response to a determination that access to the variable is permissible, creating the variable handle instance, the variable handle instance comprising one or more constrained functions configured to execute one or more constrained operations on a memory location of the variable, wherein the one or more constrained operations include one or more of: atomic operations or memory fenced operations;

identifying a second instruction that specifies a call to a particular constrained function of the one or more constrained functions of the variable handle instance, wherein the second instruction indicates the receiver; and identifying a particular memory location where the variable is stored and causing performance of the particular constrained function with respect to the particular memory location.

17. The non-transitory computer-readable medium of claim 16, wherein the receiver is a class and the variable is a static field held by the class, the receiver is a class instance and the variable is a field held by the class instance, the receiver is an array and the variable is an element of the array, or the receiver is a reference to an off-heap or direct memory location representing the variable.

18. The non-transitory computer-readable medium of claim 16, wherein the first instruction calls a lookup function that causes the variable handle instance to store an offset of the variable within the receiver and binds the one or more constrained functions of the variable handle instance to one or more descriptors that identify a type of the receiver and a type of the variable.

19. The non-transitory computer-readable medium of claim 16, wherein the steps are performed by a virtual machine managing a first memory area and the the variable is stored in a second memory area that is external to the first memory area managed by the virtual machine.

20. The non-transitory computer-readable medium of claim 16, wherein the steps further comprise:

identifying a third instruction that specifies a second call to a second particular constrained function of the one or more constrained functions of the variable handle instance, the third instruction specifying a second receiver that shares the type of the receiver; and identifying a second particular memory location where the variable is held by the second receiver and causing performance of the second particular constrained function with respect to the second particular memory location.

21. The non-transitory computer-readable medium of claim 16, wherein the steps are performed by a virtual machine and the virtual machine performs the one or more constrained operations by generating machine code instructions supported by hardware upon which the virtual machine is executing.

22. The non-transitory computer-readable medium of claim 21, wherein the one or more constrained operations include at least one constrained operation that is not natively supported by the hardware and further comprising synthesizing the constrained operation using a collection of machine code instructions supported by the hardware.

23. The non-transitory computer-readable medium of claim 16, wherein the one or more constrained operations perform one or more of: relaxed operations, volatile operations, lazy operations, compare-and-set operations, or get-and-set operations.

24. The non-transitory computer-readable medium of claim 16, wherein the second instruction comprises one or more parameters for the particular constrained function and the one or more parameters include one or more of: an array index into the receiver at which the variable is located or a value to store to the particular memory location of the variable.

25. The non-transitory computer-readable medium of claim 16, wherein the steps further comprise performing a check to ensure that the receiver specified by the second instruction matches the type of the receiver identified by the declaration information.

26. The non-transitory computer-readable medium of claim 16, wherein causing performance of the particular constrained function with respect to the particular memory location comprises calling a function that interacts with arbitrary memory locations via one or more hardware instructions.

27. The non-transitory computer-readable medium of claim 26, wherein the function that interacts with arbitrary memory locations does not perform type checking.

28. The non-transitory computer-readable medium of claim 16, wherein the one or more constrained functions of the variable handle instance include functions corresponding to one or more constrained arithmetic operations.

29. The non-transitory computer-readable medium of claim 16, wherein the variable handle instance is derived from a variable handle sub-class that extends an abstract variable handle class, the abstract variable handle class providing one or more interfaces for the one or more constrained functions and the variable handle sub-class implementing the one or more constrained functions with respect to a particular access type.

30. The non-transitory computer-readable medium of claim 29, wherein the steps further comprise: in response to a determination that the particular constrained function called by the second instruction is signature polymorphic, automatically invoking a predefined function based on a descriptor of a reference representing the call to the particular constrained function, wherein the predefined function performs a type check and invokes the particular constrained function of the variable handle instance.

* * * * *

UNITED STATES PATENT AND TRADEMARK OFFICE

CERTIFICATE OF CORRECTION

PATENT NO. : 9,690,709 B2
APPLICATION NO. : 14/681017
DATED : June 27, 2017
INVENTOR(S) : Sandoz et al.

It is certified that error appears in the above-identified patent and that said Letters Patent is hereby corrected as shown below:

In Column 4, Line 7, delete "instantion" and insert -- instantiation --, therefor.

In Column 4, Line 42, delete "JavaVirtual" and insert -- Java Virtual --, therefor.

In Column 4, Line 48, delete ""fuctions"." and insert -- "functions". --, therefor.

In Column 10, Line 10, delete "operends" and insert -- operands --, therefor.

In Column 10, Line 18, delete "operends" and insert -- operands --, therefor.

In Column 13, Line 12, after "methods" insert -- . --.

In Column 18, Line 32, delete ""(L Receiver)L Value." and insert -- "(L Receiver) L Value". --, therefor.

In Column 20, Lines 63-64, delete "set volatile" and insert -- setVolatile --, therefor.

In Column 21, Line 63, delete "of the of the" and insert -- of the --, therefor.

In Column 22, Lines 25-26, delete "implemention" and insert -- implementation --, therefor.

In Column 24, Line 13, delete "index I" and insert -- index i --, therefor.

In Column 26, Line 19, after ".html)" insert -- . --.

In Column 27, Line 50, delete "gurantee" and insert -- guarantee --, therefor.

In Column 28, Line 5, delete "to to" and insert -- to --, therefor.

In Column 33, Line 51, delete "claim 29," and insert -- Clause 29, --, therefor.

Signed and Sealed this
Twentieth Day of February, 2018

Andrei Iancu
*Director of the United States Patent and Trademark Office*

In Column 36, Line 37, in Claim 9, delete “the the” and insert -- the --, therefor.

In Column 36, Line 41, in Claim 10, delete “the the” and insert -- the --, therefor.

In Column 37, Line 52, in Claim 19, delete “the the” and insert -- the --, therefor.